(12) United States Patent
Ando

(10) Patent No.: US 7,643,462 B2
(45) Date of Patent: Jan. 5, 2010

(54) SELECTIVE STORING ORDER METHOD IN CDMA RECEIVER

(75) Inventor: Kimiaki Ando, Yokosuka (JP)

(73) Assignee: Panasonic Corporation, Osaka (JP)

( * ) Notice: Subject to any disclaimer, the term of this patent is extended or adjusted under 35 U.S.C. 154(b) by 616 days.

(21) Appl. No.: 10/559,685

(22) PCT Filed: May 27, 2004

(86) PCT No.: PCT/JP2004/007671

§ 371 (c)(1),
(2), (4) Date: Dec. 6, 2005

(87) PCT Pub. No.: WO2004/112270

PCT Pub. Date: Dec. 23, 2004

(65) Prior Publication Data

US 2006/0120331 A1   Jun. 8, 2006

(30) Foreign Application Priority Data

Jun. 10, 2003  (JP) ............................. 2003-165308

(51) Int. Cl.
*H04B 7/216* (2006.01)
*H04B 7/00* (2006.01)
(52) U.S. Cl. ........................ 370/342; 370/310; 370/335
(58) Field of Classification Search ................. 370/310, 370/342, 320, 335, 441; 375/316, 347
See application file for complete search history.

(56) References Cited

U.S. PATENT DOCUMENTS

| | | | | |
|---|---|---|---|---|
| 5,793,759 A | * | 8/1998 | Rakib et al. | 370/342 |
| 6,108,370 A | * | 8/2000 | Naruse | 375/150 |
| 6,426,949 B1 | * | 7/2002 | Zhou et al. | 370/342 |
| 6,510,187 B2 | * | 1/2003 | Saito et al. | 375/344 |
| 6,556,834 B1 | * | 4/2003 | Kobayashi et al. | 455/464 |
| 6,574,200 B1 | * | 6/2003 | Tsumura | 370/311 |
| 6,628,733 B1 | * | 9/2003 | Tomiyoshi et al. | 375/347 |
| 6,819,927 B1 | * | 11/2004 | Sato | 455/437 |
| 6,980,585 B2 | * | 12/2005 | Yamada et al. | 375/148 |
| 7,254,160 B2 | * | 8/2007 | Kawamoto et al. | 375/148 |
| 7,359,428 B2 | * | 4/2008 | Rovini et al. | 375/141 |
| 7,453,955 B2 | * | 11/2008 | Doi | 375/316 |

FOREIGN PATENT DOCUMENTS

| | | |
|---|---|---|
| JP | 10-112673 | 4/1998 |
| JP | 2001-267959 | 9/2001 |
| JP | 2002-171200 | 6/2002 |

* cited by examiner

*Primary Examiner*—Sonny Trinh
(74) *Attorney, Agent, or Firm*—McDermott Will & Emery LLP

(57) ABSTRACT

A receiver allows a user to select received data before de-spreading or symbol data after de-spreading according to various factors when data is simultaneously received via multiple channels and to store the selected data, reduces the capacity of the storage memory, and enhances the degree of freedom of the timing of de-spreading processing. Storing the received data in the storage memory not in the form of symbol data produced after de-spreading but in the form of received data before de-spreading. This reduces the capacity of the storage memory and enhances the degree of the freedom of the timing of the de-spreading process.

17 Claims, 31 Drawing Sheets

FIG. 27

<CONDITION>
· W-CDMA METHOD
· NUMBER OF CHANNELS 15
· NUMBER OF RECEIVE DATA BITS 6
· NUMBER OF FINGER PASSES 12
· STORAGE TIME 1 SLOT
· DIFFUSION RATE 4

| | CASE OF SYMBOL BUFFER AFTER REVERSE DIFFUSION | CASE OF RECEIVE DATA BUFFER |
|---|---|---|
| TOTAL NUMBER OF BITS OF MEMORY | 6(NUMBER OF INPUT BITS) <br> x5(AMPLIFICATION INCREASE RATE BY REVERSE DIFFUSION) <br> x12(NUMBER OF FINGER PASSES) <br> x(2560/16)(NUMBER OF SYMBOLS IN SLOT) <br> x15(NUMBER OF CHANNELS) <br> x2(IQ) <br> =144000 BITS | 6(NUMBER OF INPUT BITS) <br> x(2560x4)(NUMBER OF SAMPLES IN SLOT) <br> x2(IQ) <br> =122880 BITS |

SELECTIVE STORING ORDER METHOD IN CDMA RECEIVER

RELATED APPLICATION

This application is a national phase of PCT/JP2004/007671 filed on May 27, 2004, which claims priority from Japanese Application No. 2003-165308 which was filed on Jun. 10, 2003, the disclosures of which Applications are incorporated by reference herein. The benefit of the filing and priority dates of the International and Japanese Applications is respectfully requested.

TECHNICAL FIELD

The present invention relates to a receiving device related to a code division multiplex communication.

BACKGROUND ART

In the case in which a receiving operation is to be carried out in a code division multiplex communication, a receiving device has a structure shown in FIG. 28. The receiving device has an AD converting portion 1501, a reverse diffusing portion 1502, a synchronous detecting portion 1503, a weighting portion 1504, a rake synthesizing portion 1505, a channel decoding portion 1506, and an error correcting portion 1507.

Receive data 1500 are digitized by the AD converting portion 1501, are subjected to a reverse diffusion processing in the reverse diffusing portion 1502, are synchronously detected by the synchronous detecting portion 1503 to carry out a phase adjustment through the phasing of a receiving signal, and are then rake synthesized by the rake synthesizing portion 1505 and are thereafter channel decoded by the channel decoding portion 1506, and furthermore, are error corrected by the error correcting portion 1507 and are output as decode data 1508.

The synchronous detection in the synchronous detecting portion 1503 is often carried out by a method such as an interpolation. As shown in FIG. 29, in the interpolating synchronous detection, a shift of a frequency of a carrier signal from a transmitting device side and the amount of a phase rotation by phasing are obtained by using front and rear pilot symbols on a time basis for the receiving symbol, thereby calculating a phase estimation value.

In this case, a rear receiving signal on a time basis is used. Therefore, it is necessary to store the symbol of a synchronous detected channel other than a pilot symbol for a phase estimation and to calculate the phase estimation value, thereafter carrying out the synchronous detection.

In the code division multiplex communication, in order to reduce a data volume to be stored, there is generally taken a method of digitizing receive data by an AD converting portion 1401 and reversely diffusing the same data by reverse diffusing portions 1402, 1407, 1413 and 1419, and then storing the symbol of a synchronous detected channel other than a pilot symbol for a phase estimation by memories 1404, 1408, 1415 and 1420 (see Patent Document 1). In FIG. 22, 1403, 1409, 1414 and 1421 denote a phase estimating portion, 1405, 1410, 1416 and 1422 denote a synchronous detecting portion, and 1406, 1411, 1417 and 1423 denote a weighting portion.

(Patent Document 1) JP-A-2002-171200 Publication (FIG. 7)

However, a standard for receiving a large number of channels diffused and modulated by using different diffusion codes at the same time to enhance a communication speed has appeared by a need for a high-speed data communication. Accordingly, there is a problem in that a large number of reverse diffusing portions for receiving a plurality of channels at the same time and a large number of arithmetic unit resources for a synchronous detection are required and the amount of receive data subjected to the reverse diffusion is increased. This causes an increase in the scale of a circuit.

On the other hand, it is advantageous to store symbol data obtained after the reverse diffusion in order to enhance the use efficiency of a memory and to reduce memories to be mounted on the receiving device depending on the quantity of a symbol rate or a multipass in some cases.

There will be described a specific example of a reduction in the memories to be mounted. In a CDMA communication, symbol data received for carrying out a synchronous detection and rake synthesis are to be stored for a constant section every multipass. In the CDMA communication, in the case in which a diffusion rate is high, a data size can be reduced by an integral calculation to be carried out in the reverse diffusion. In a recent high-speed data communicating method having a low diffusion rate, a diffusion rate is low (for example, 4) and a larger memory space than original receive data is used in consideration of the storage of data corresponding to a multipass in some cases.

FIG. 31 shows a specific example. In case of an 8-bit input, a 256-time diffusion and 12 multipasses, 8 kB receive data can be stored in a capacity of approximately 0.8 kB after the reverse diffusion, which is efficient. In case of a 4-time diffusion and 12 multipasses, a capacity of 33 kB is required after the reverse diffusion so that the efficiency of the data storage is low. Therefore, it is preferable that the 8-bit input signal should be stored before the reverse diffusion and the reverse diffusion and synchronous detecting processings should be executed when data for a desirable section which is required for the synchronous detection can be stored.

The reverse diffusing portion requires a real-time processing for the receive data so that it is hard to carry out sharing on a circuit resource basis and a change into dedicated hardware is indispensable. For this reason, there has been demanded an enhancement in a degree of freedom of a processing timing in the reverse diffusion processing during the simultaneous receipt of a large number of channels.

It is an object of the invention to provide a receiving device capable of reducing a storage memory when receiving a large number of channels at the same time and enhancing a degree of freedom of a processing timing in a reverse diffusion processing.

DISCLOSURE OF THE INVENTION

A first aspect of the invention is directed to a receiving device for carrying out an interpolating synchronous detection when receiving a code division multiple signal, comprising storage means for storing receive data which are an object to be detected synchronously, and control means for switching a storage of the receive data which are the object to be detected synchronously in the storage means before or after a reverse diffusion.

According to the structure, it is possible to efficiently use the memory of the storage means by switching the storage of the receive data in the storage means before or after the reverse diffusion by various factors.

A second aspect of the invention is directed to the receiving device according to the first aspect of the invention, wherein the control means changes a storage order for the receive data based on symbol rate information obtained when demodulating the receive data.

According to the structure, for example, the receive data are stored in the storage means before the reverse diffusion when the symbol rate is increased, and the receive data are stored in the storage means after the reverse diffusion when the symbol rate is reduced. Consequently, the memory of the storage means can be used efficiently and the memories to be mounted can be reduced.

A third aspect of the invention is directed to the receiving device according to the first aspect of the invention, wherein the control means changes a storage order for the receive data based on multipass information obtained when demodulating the receive data.

According to the structure, for example, the receive data are stored in the storage means after the reverse diffusion when the multipasses are decreased, and the receive data are stored in the storage means before the reverse diffusion when the multipasses are increased. Consequently, the use efficiency of the memory of the storage means can be enhanced and the memories to be mounted can be reduced.

A fourth aspect of the invention is directed to the receiving device according to the first aspect of the invention, wherein the control means changes a storage order for the receive data in response to an instruction sent from a power control system of the receiving device.

According to the structure, if the receive data are switched to be stored in the storage means after the reverse diffusion in accordance with an instruction given from the power control system, for example, the frequency of access to the memory of the storage means is decreased so that a power consumption can be reduced and power saving can be carried out.

A fifth aspect of the invention is directed to the receiving device according to any of the first to fourth aspects of the invention, further comprising means for carrying out a receipt processing corresponding to a plurality of multipasses, thereby rake synthesizing a plurality of receiving signals demodulated on a pass correspondence.

According to the structure, when the number of multipasses is large, the receive data are stored in the storage means before the reverse diffusion. Consequently, it is possible to carry out a synchronous detection without increasing the memory capacity of the storage means.

A sixth aspect of the invention is directed to the receiving device according to any of the first to fifth aspects of the invention, further comprising means for independently receiving a pilot symbol to carry out a phase estimation for a synchronous detection and receiving a data symbol, the control means carrying out a switching control for a storage of the received data symbol which are the object to be detected synchronously in the storage means before or after the reverse diffusion when independently receiving the pilot symbol and the data symbol respectively.

According to the structure, the received data symbol is stored in the storage means, and at the same time, the received pilot symbol is subjected to the reverse diffusion and is then subjected to the synchronous detection to obtain the amount of a shift rotation and a weighted value, and thereafter, the necessary data symbols for the processing are stored and gathered perfectly, and are read and reversely diffused, and subsequently, a synchronous detection, a weighting and a rake synthesis are carried out by using the amount of a shift rotation and the weighted value and a demodulation is then performed. Consequently, the memories of the storage means can be reduced.

A seventh aspect of the invention is directed to the receiving device according to any of the first to sixth aspects of the invention, wherein a reverse diffusion processing and a synchronous detection processing for receiving signals of a plurality of channels are carried out by using an identical circuit.

According to the structure, it is not necessary to prepare a circuit corresponding to a plurality of channels. Therefore, it is possible to reduce the scale of a circuit.

An eighth aspect of the invention is directed to the receiving device according to any of the first to seventh aspects of the invention, wherein a reverse diffusion processing and a synchronous detection processing for receiving signals of a plurality of passes are carried out by using an identical circuit.

According to the structure, it is not necessary to prepare a circuit corresponding to a plurality of passes. Therefore, it is possible to reduce the scale of a circuit.

A ninth aspect of the invention is directed to the receiving device according to any of the first to eighth aspects of the invention, wherein a reverse diffusion processing, a synchronous detection processing and a rake synthesis processing for a plurality of passes and a plurality of channels are carried out at the same time by using an identical circuit.

According to the structure, it is not necessary to prepare a circuit corresponding to a plurality of passes and a plurality of channels. Consequently, the scale of a circuit can be reduced, and furthermore, a common processing can be simultaneously carried out for each pass and each channel, and a degree of freedom of a processing timing in a reverse diffusion processing can be enhanced.

A tenth aspect of the invention is directed to the receiving device according to any of the first to ninth aspects of the invention, wherein the storage means has storage memories corresponding to an oversampling degree or a plurality of storage memories.

According to the structure, it is possible to enhance precision in the timing of the reverse diffusion processing of the receive data by carrying out the oversampling at time of a receipt. In that case, memories corresponding to the oversampling degree or a plurality of storage memories are/is provided. Therefore, it is possible to reduce, to a chip rate, the access speed of each of the storage memories in the reverse diffusion processing and the speed of an arithmetic unit for the reverse diffusion. Thus, it is possible to reduce the consumed power of a circuit and to easily carry out a clock management.

An eleventh aspect of the invention is directed to the receiving device according to any of the first to eighth aspects of the invention, wherein receive data read continuously from the storage means are consecutively diffused reversely.

According to the structure, the receive data are read continuously from the storage means. Consequently, it is possible to carry out a centralized control for the read of the receive data and to easily perform a demodulating control such as a reverse diffusion processing.

A twelfth aspect of the invention is directed to the receiving device according to any of the first to eleventh aspects of the invention, wherein receive data read from the storage means in an optional order are diffused reversely.

According to the structure, the receive data are read from the storage means in an optional order. Consequently, it is possible to read the receive data in a necessary order for the reverse diffusion processing and to easily carry out the demodulating control such as the reverse diffusion processing.

A thirteenth aspect of the invention is directed to the receiving device according to any of the first to twelfth aspects of the invention, wherein the control means changes contents of a calculation in accordance with a program.

According to the structure, it is possible to freely carry out a change depending on uses by varying the programs such as the storage order for the receive data by the control means. Thus, it is possible to perform a utilization for various applications.

A fourteenth aspect of the invention is directed to the receiving device according to any of the first to thirteenth aspects of the invention, wherein the storage means divides the data obtained before and after the reverse diffusion and stores them therein, respectively.

According to the structure, a region for storing the data obtained before the reverse diffusion and a region for storing the data obtained after the reverse diffusion are maintained by a division of one storage memory region. Consequently, it is possible to enhance the degree of freedom of the combination of a storage order for the data.

A fifteenth aspect of the invention is directed to the receiving device according to any of the fourteenth aspect of the invention, wherein the control means changes a storage order for the receive data depending on a symbol rate and the number of fingers in each of a plurality of receiving channels.

According to the structure, it is possible to use an optimum storage memory by changing the storage order for the receive data depending on the symbol rate and the number of fingers in each of the receiving channels.

A sixteenth aspect of the invention is directed to the receiving device according to the fourteenth aspect of the invention, wherein when an error is found in a demodulating signal of a receiving signal, data stored in the storage means are synthesized with data retransmitted in accordance with a hybrid ARQ method.

According to the structure, the receive data subjected to the reverse diffusion are output, and furthermore, are stored in the storage means. When the demodulating signal of the receiving signal has an error and an instruction for a retransmission is given, the stored data can be synthesized with the data to be retransmitted in accordance with the hybrid ARQ method and necessary receive data for the retransmission in the hybrid ARQ method can easily be held.

BRIEF DESCRIPTION OF THE DRAWINGS

FIG. 27 is a table showing the memory reducing effect of the receiving device according to the sixth embodiment of the invention.

Figure 1:
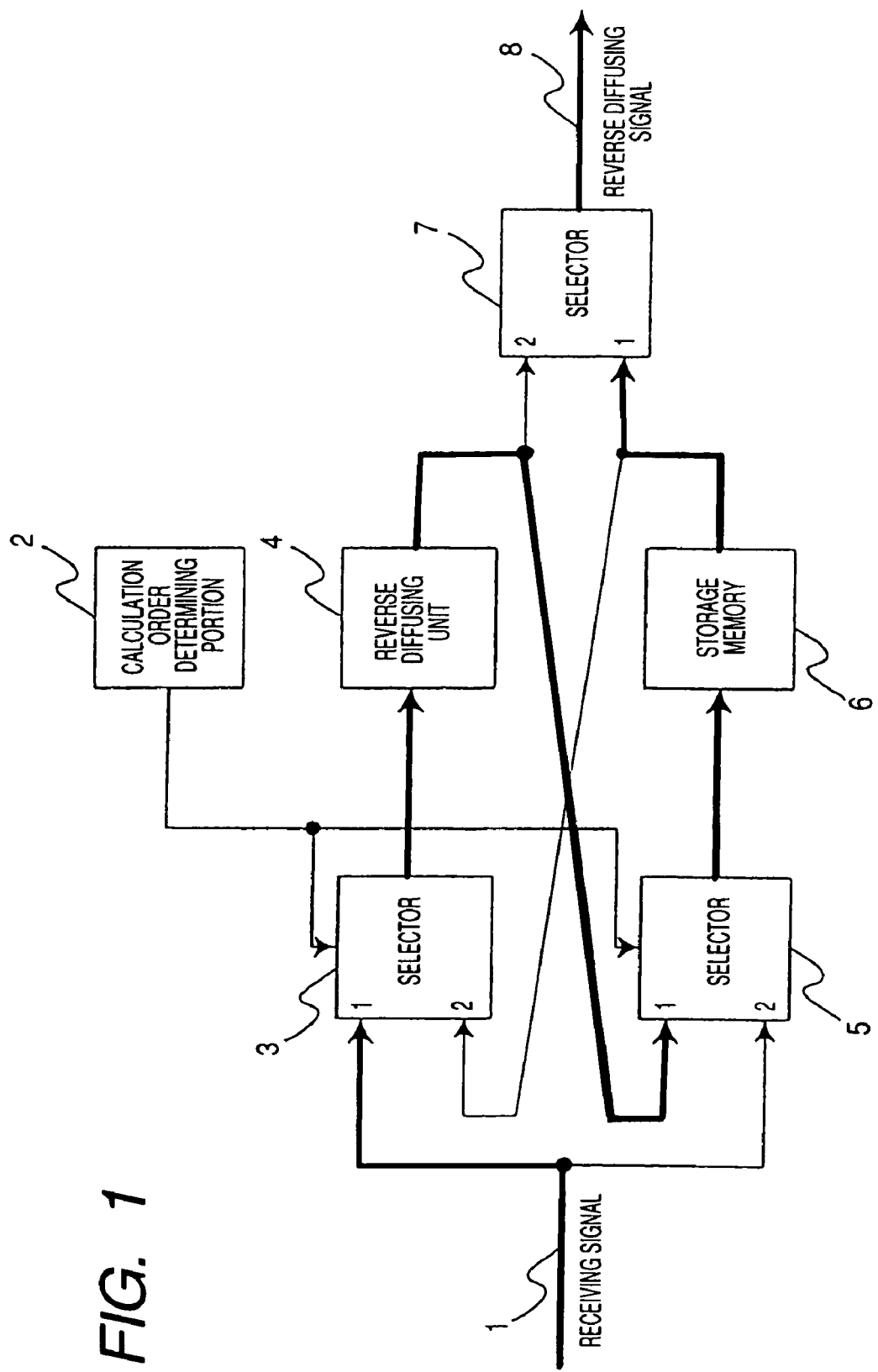
FIG. 1 is a block diagram showing the structure of the main part of a receiving device according to a first embodiment of the invention.

In the drawings, the reference numerals 2, 21, 31, 41, 902, 1002 and 1102 denote a calculation order determining portion, the reference numerals 3, 5, 7, 22, 24, 26, 32, 34, 36, 42, 44, 46, 102, 104, 107, 111, 114, 202, 302, 402, 502, 602, 901, 904, 905, 909, 910, 911, 1001, 1004, 1005, 1009, 1010, 1011, 1101, 1104, 1105, 1109, 1110 and 1111 denote a selector, the reference numerals 4, 23, 33, 43, 105, 112, 903, 1003 and 1103 denote a reverse diffusing portion, the reference numerals 6, 25, 35, 45, 103, 203, 303, 403, 503, 604, 702, 802, 907, 1007 and 1107 denote a storage memory, the reference numerals 101, 201, 301, 401, 501, 601 and 1202 denote an AD converting portion, the reference numerals 106 and 113 denote a phase estimating portion, the reference numerals 108 and 115 denote a synchronous detecting portion, the reference numerals 109 and 116 denote a weighting portion, the reference numerals 110, 117, 218, 233, 314, 324, 409, 413, 417, 507, 510, 511, 609, 613, 616, 708, 711, 725, 808, 811 and 824 denote a finger unit, the reference numerals 118, 234, 236, 325 and 418 denote a rake synthesizing portion, the reference numerals 209, 214, 224, 229, 310 and 320 denote a channel unit, the reference numerals 512 and 615 denote a reverse diffusing/synchronous detecting/weighting/rake synthesizing portion, the reference numerals 705 and 805 denote a timing generating portion, the reference numeral 927 denotes an address and timing calculating procedure storage device, the reference numeral 1200 denotes an antenna, the reference numeral 1201 denotes an RF/IF circuit, the reference numeral 1203 denotes a receiving device, the reference numeral 1204 denotes a decoding/error correcting portion, the reference numeral 1205 denotes a rate detecting portion, the reference numeral 1206 denotes a DA converting portion, the reference numeral 1207 denotes a transmitting portion, the reference numeral 1208 denotes a coding portion, the reference numeral 1209 denotes a communicating device, the reference numeral 1300 denotes a base station, and the reference numeral 1301 denotes a mobile station.

BEST MODE FOR CARRYING OUT THE INVENTION

First Embodiment

Figure 2:
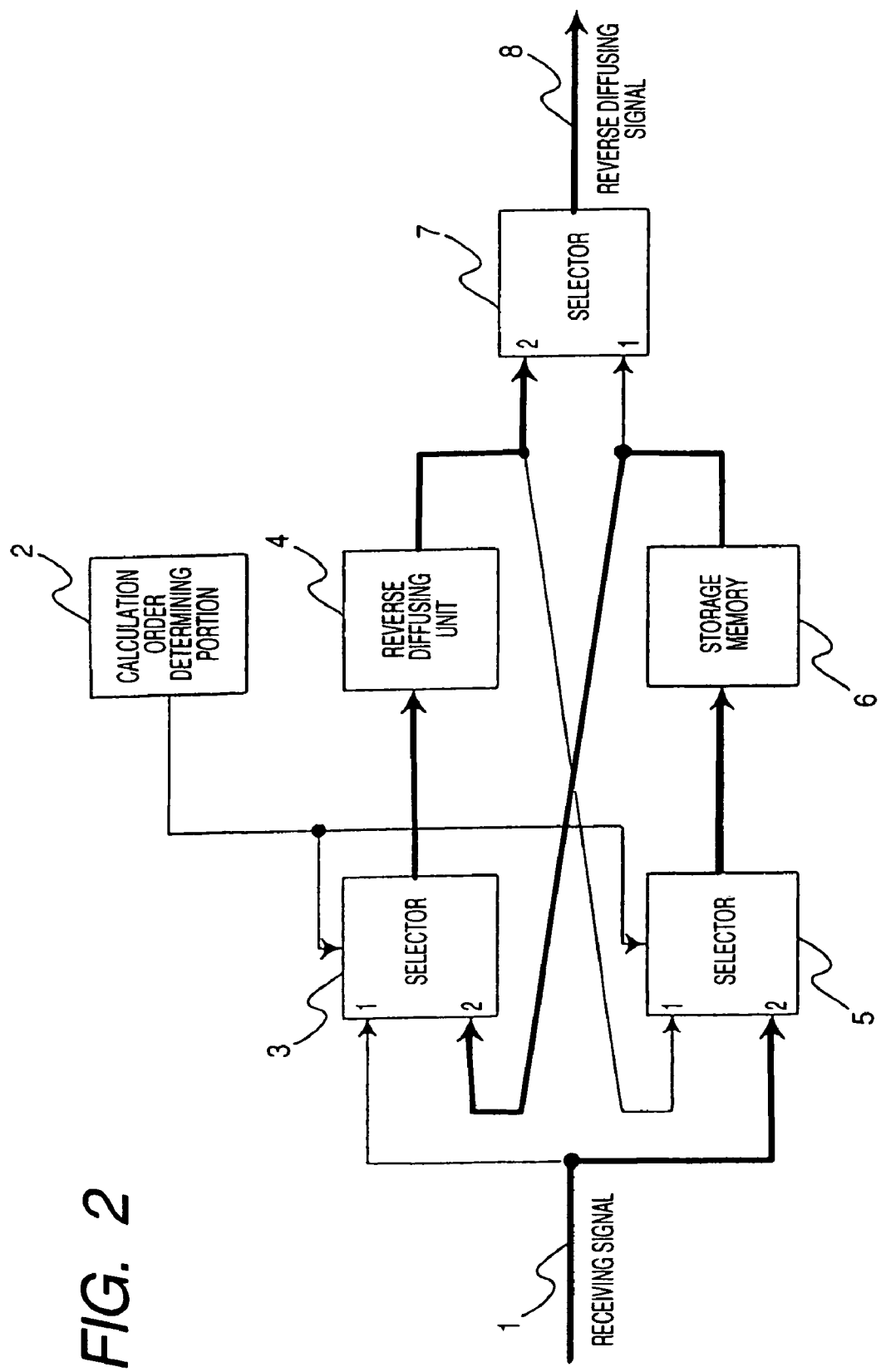
FIG. 2 is a block diagram showing the structure of the main part of the receiving device according to the first embodiment of the invention.

Embodiments of the invention will be described below with reference to the drawings. FIGS. 1 and 2 are block diagrams showing the structure of the main part of a receiving device according to a first embodiment of the invention. The receiving device has a calculation order determining portion 2, a selector 3, a reverse diffusing portion 4, a selector 5, a storage memory 6 and a selector 7, and a reverse diffusion-delay processing system is constituted by them.

Next, description will be given to an operation according to the embodiment. The calculation order determining portion 2 switches the selectors 3, 5 and 7 corresponding to various control factors. As shown in FIG. 1, the path of the reverse diffusion-delay processing system is obtained in the case in which the selectors 3, 5 and 7 are switched to select and output an input (1) by the calculation order determining portion 2, and a structure in which a storage is carried out after a reverse diffusion is obtained.

More specifically, a receiving signal 1 is led to the reverse diffusing portion 4 through the selector 3 to carry out the reverse diffusion processing. The receiving signal 1 subjected to the reverse diffusion processing is stored in the storage memory 6 through the selector 5, and is selected by the selector 7 and is output as a reverse diffusing signal 8.

As shown in FIG. 2, the path of the reverse diffusion-delay processing system is obtained in the case in which the selectors 3, 5 and 7 are switched to select and output an input (2) by the calculation order determining portion 2, and a structure in which the storage is carried out before the reverse diffusion is obtained.

More specifically, the receiving signal 1 is stored in the storage memory 6 through the selector 5. Then, the receiving signal 1 is led from the storage memory 6 to the reverse diffusing portion 4 through the selector 3, and the output of the reverse diffusing portion 4 is selected by the selector 7 and is transmitted as the reverse diffusing signal 8.

According to the receiving device in accordance with the first embodiment, the storage of the receive data after or before the reverse diffusion is switched by the calculation order determining portion 2 depending on various factors. Therefore, it is not necessary to provide respective dedicated storage memories, and it is possible to reduce the storage memories when receiving a large number of channels at the same time. Moreover, the receive data stored before the reverse diffusion do not need to be subjected to the reverse diffusion processing in real time. Therefore, it is possible to enhance a degree of freedom of a processing timing in the reverse diffusion processing of the reverse diffusing portion 4.

Second Embodiment

Figure 3:
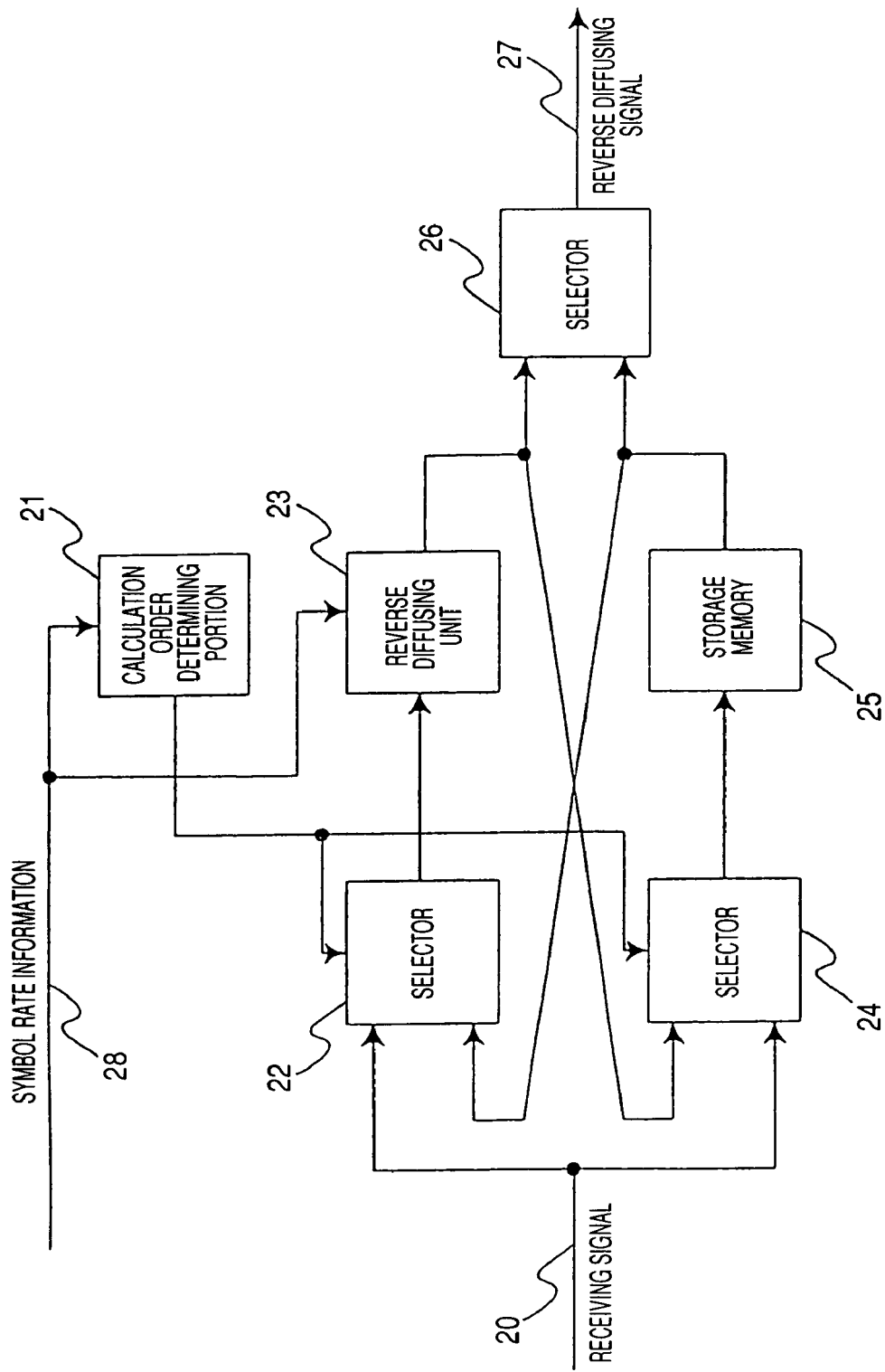
FIG. 3 is a block diagram showing the structure of the main part of a receiving device according to a second embodiment of the invention.

FIG. 3 is a block diagram showing the structure of the main part of a receiving device according to a second embodiment of the invention. In the embodiment, the input of symbol rate information 20 is provided as a factor for a calculation order determining portion 21. Consequently, a structure in which the storage of receive data after or before a reverse diffusion is switched is employed and other structures are the same as those in the first embodiment.

Next, description will be given to an operation according to the embodiment. When a certain symbol rate or more is reached, it is more preferable that the receive data should be stored in a storage memory 25 in a state brought before the reverse diffusion than a state brought after the reverse diffusion. When the symbol rate of the symbol rate information 20 is equal to or greater than a certain value, therefore, the calculation order determining portion 21 switches selectors 22, 24 and 26 to select an input (2) side, thereby storing the receive data in the storage memory 25 before the reverse diffusion. When the symbol rate of the symbol rate information 20 is smaller than the certain value, moreover, the calculation order determining portion 21 switches the selectors 22, 24 and 26 to select an input (1) side, and the receive data are subjected to the reverse diffusion in a reverse diffusing portion 23 and are then stored in the storage memory 25.

According to the receiving device in accordance with the second embodiment, it is possible to select a storage order for the receive data with a high memory storage efficiency based on the symbol rate, thereby enhancing the use efficiency of the storage memory 25 and reducing memories to be mounted on the receiving device.

Third Embodiment

Figure 4:
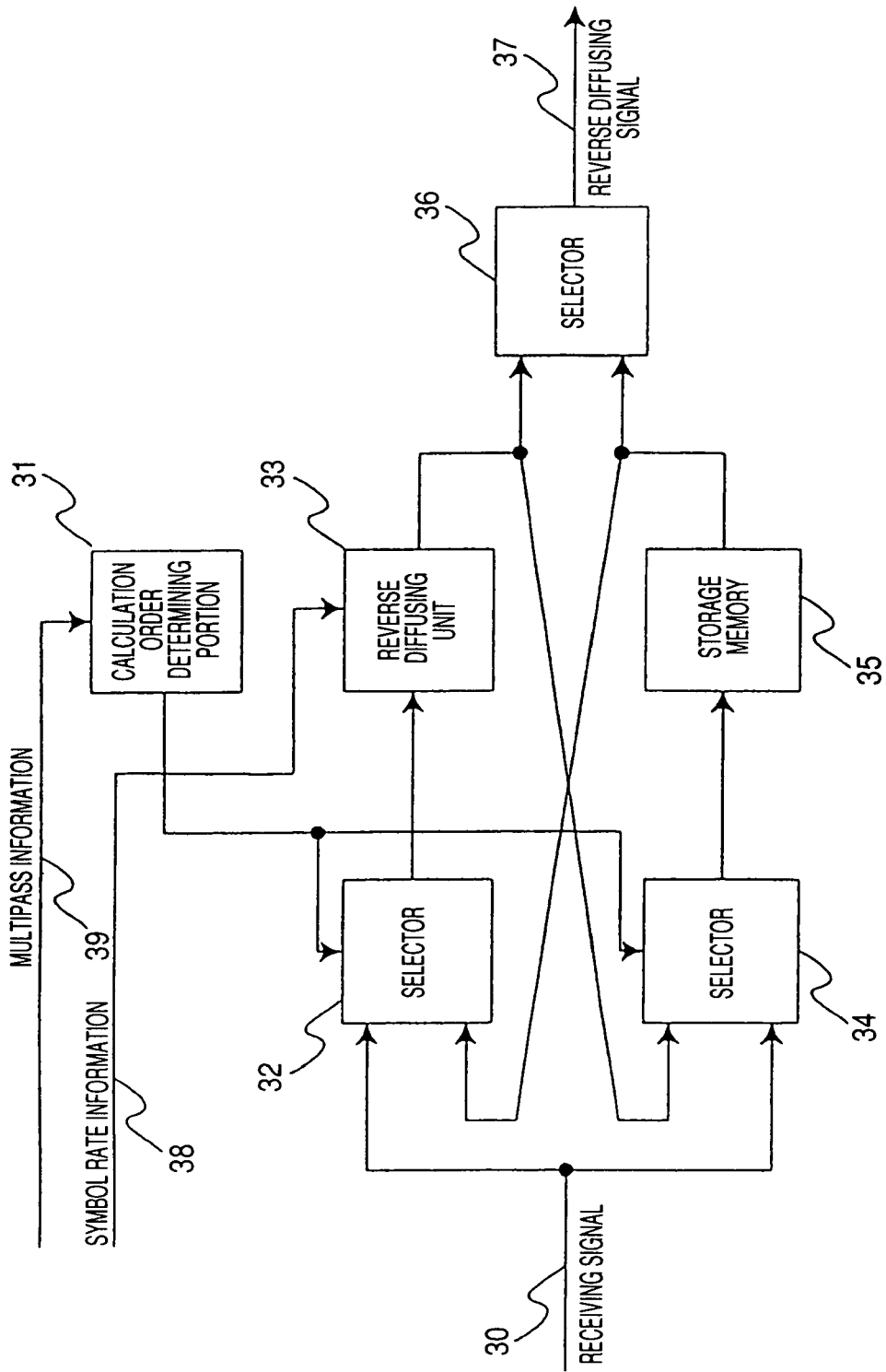
FIG. 4 is a block diagram showing the structure of the main part of a receiving device according to a third embodiment of the invention.

FIG. 4 is a block diagram showing the structure of the main part of a receiving device according to a third embodiment of the invention. In the embodiment, the input of multipass information 39 is provided as a factor for a calculation order determining portion 31. Consequently, a structure in which the storage of receive data after or before a reverse diffusion is switched is employed and other structures are the same as those in the first embodiment.

Next, description will be given to an operation according to the embodiment. The number of multipasses to be received is varied depending on the moving speed of the receiving device and the environment of a place in which the receiving device is positioned. In the case in which the number of the multipasses is small, it is more advantageous to store the receive data in a storage memory 35 after the reverse diffusion. When the multipass of the multipass information 39 has a certain value or less, therefore, the calculation order determining portion 31 switches selectors 32, 34 and 36 to select an input (1) side, thereby storing the receive data in the storage memory 35 after the reverse diffusion in a reverse diffusing portion 33. When the multipass of the multipass information 39 exceeds the certain value and the number of the multipasses is increased, moreover, a memory use efficiency is not increased in the data obtained after the reverse diffusion. Therefore, the calculation order determining portion 31 switches the selectors 32, 34 and 36 to select an input (2) side, thereby storing the receive data in the storage memory 35 before the execution of the reverse diffusion in the reverse diffusing portion 33.

According to the receiving device in accordance with the third embodiment, it is possible to select a storage order for the receive data with a high memory use efficiency depending on the quantity of the multipass, thereby enhancing the use efficiency of the storage memory 35 and reducing memories to be mounted on the receiving device.

Fourth Embodiment

Figure 5:
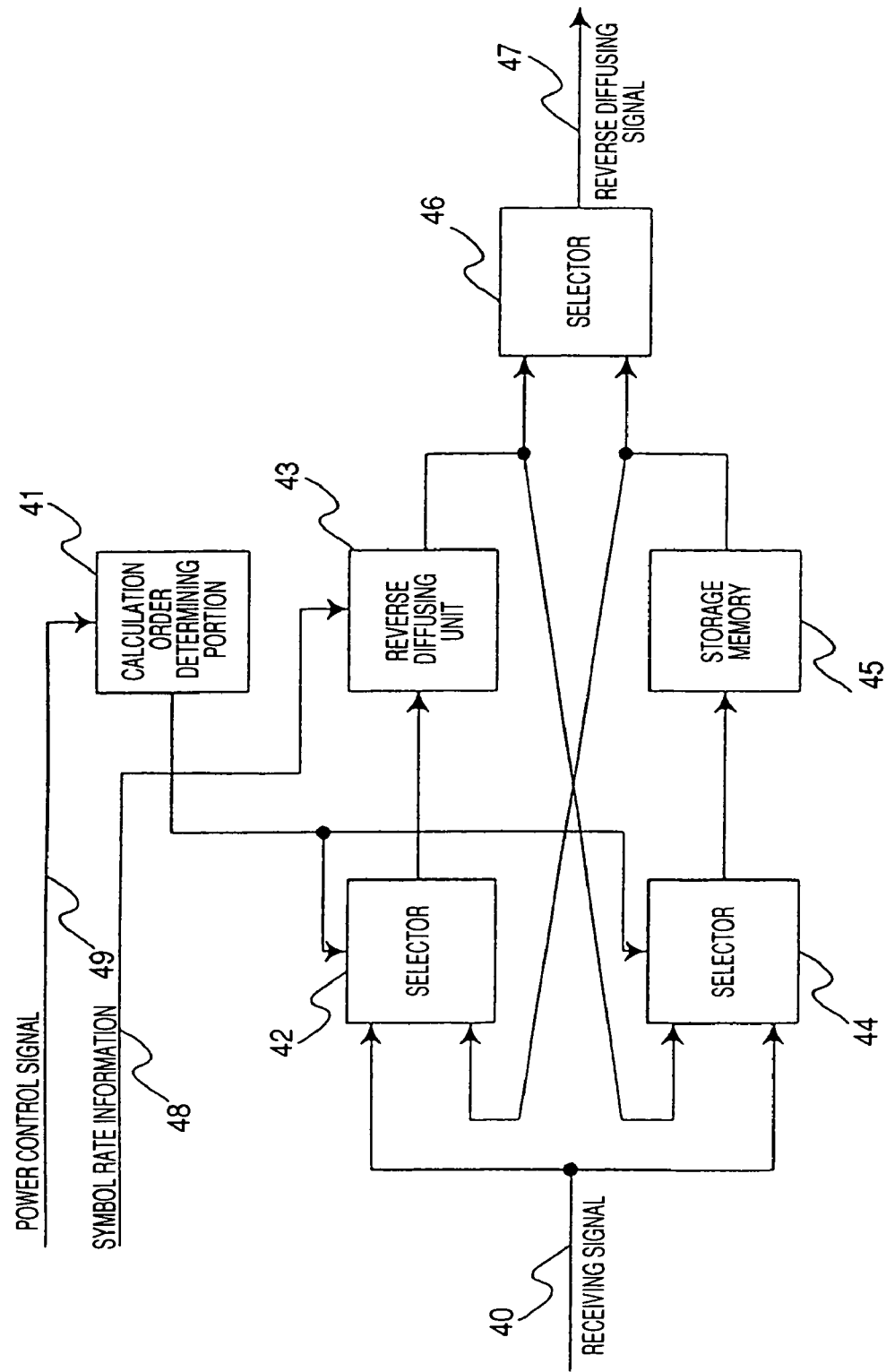
FIG. 5 is a block diagram showing the structure of the main part of a receiving device according to a fourth embodiment of the invention.

FIG. 5 is a block diagram showing the structure of the main part of a receiving device according to a fourth embodiment of the invention. In the embodiment, the input of a power control signal 49 is provided as a factor for a calculation order determining portion 41. Consequently, a structure in which the storage of receive data after or before a reverse diffusion is switched is employed and other structures are the same as those in the first embodiment.

Next, description will be given to an operation according to the embodiment. In general, data which have not been subjected to the reverse diffusion are handled for the storage of the receive data in a storage memory 45 in a state brought before the reverse diffusion. Therefore, the frequency of memory access also tends to be high and the amount of a power to be consumed tends to be increased. In the case in which the power control signal 49 gives an instruction for power saving, the calculation order determining portion 41 switches selectors 42, 44 and 46 to select an input (1) side, thereby diffusing the receive data reversely in a reverse diffusing portion 43 and then storing the same data in the storage memory 45. In the case in which the power control signal 49 does not give the instruction for the power saving, moreover, the calculation order determining portion 41 switches the selectors 42, 44 and 46 to select an input (2) side, thereby storing the receive data in the storage memory 45 before carrying out the reverse diffusion in the reverse diffusing portion 43.

According to the receiving device in accordance with the fourth embodiment, the receive data are stored in the storage memory 45 before or after the reverse diffusion in respect of a consumed power. Therefore, it is possible to prolong the lifetime of a battery by reasonably using a power. The power control signal 49 is determined by the number of passes, the stability of the passes, the amount of a change in a power control signal to be used in a CDMA, a symbol rate and the capacity of a battery. In the case in which the structure of the circuit according to the embodiment is implemented by a semiconductor circuit, moreover, the power control signal 49 is given as the parameter of the operating clock of the circuit, and may be interlocked with a change in the operating clock and operating voltage of the circuit in a low power mode.

Fifth Embodiment

Figure 6:
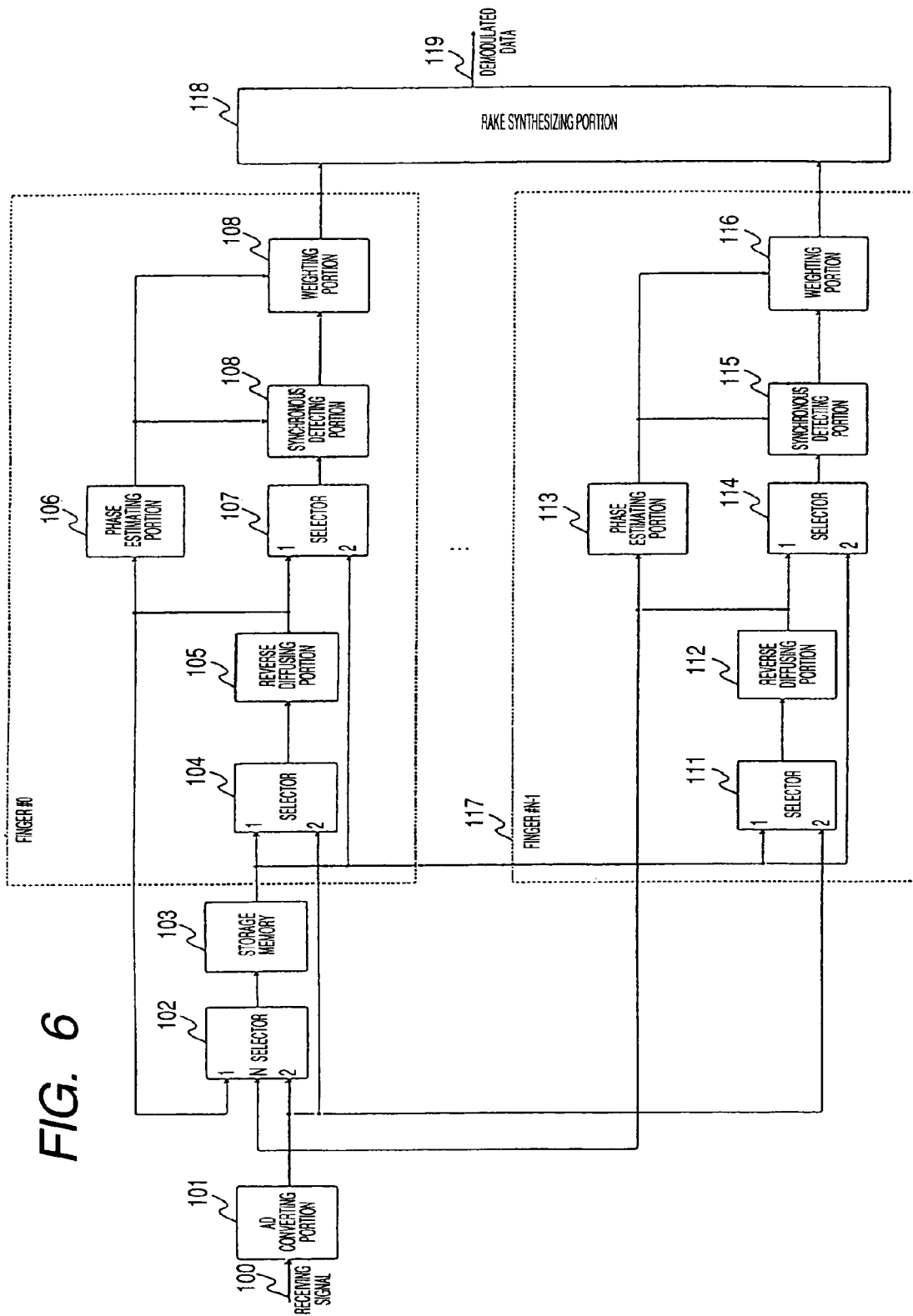
FIG. 6 is a block diagram showing the structure of a receiving device according to a fifth embodiment of the invention.

FIG. 6 is a block diagram showing the structure of a receiving device according to a fifth embodiment of the invention. The receiving device has an AD converting portion 101, a selector 102 for selecting a storage order for receive data, a storage memory 103, a selector 104 for selecting the receive data to be diffused reversely, a reverse diffusing portion 105, a phase estimating portion 106, a selector 107 for selecting data to be detected synchronously, a synchronous detecting portion 108, a weighting portion 109, and a rake synthesizing portion 118, and the selector 104, the reverse diffusing portion 105, the phase estimating portion 106, the selector 107, the synchronous detecting portion 108 and the weighting portion 109 constitute a finger unit 110 (#0) and a selector 111, a reverse diffusing portion 112, a phase estimating portion 113, a selector 114, a synchronous detecting portion 115 and a weighting portion 116 constitute a finger unit 117 (#N−1). In the receiving device, the number of fingers is N.

Next, description will be given to an operation according to the embodiment. A receiving signal 100 is converted into discrete data by the AD converting portion 101 and the discrete data are then stored in the storage memory 103 through the selector 102 or are input to the reverse diffusing portions 105 and 112.

In the case in which the data are stored together with the receive data in a state brought before the reverse diffusion, the selector 102 is switched to (0) and the selectors 104, 107, 111 and 114 are switched to (1) respectively. Consequently, the receive data (the discrete data) are stored in the storage memory 103 through the selector 102. When the receive data corresponding to necessary symbols for a phase estimation are gathered perfectly, then, the receive data read from the storage memory 103 are input to the reverse diffusing portions 105 and 112 through the selectors 104 and 111. Therefore, the reverse diffusing portions 105 and 112 carry out a reverse diffusion for a pilot symbol so that the reverse diffused data are input to the phase estimating portions 106 and 113. The phase estimating portions 106 and 113 obtain the amount of a phase rotation and a weighted value based on the reverse diffused data.

At the same time, the reverse diffusing portions 105 and 112 reversely diffuse a data symbol (an object to be detected synchronously) and the amounts of a phase rotation of fingers obtained in the phase estimating portions 106 and 113 are multiplied in the synchronous detecting portions 108 and 115, and the weighted values of the fingers which are obtained in the phase estimating portions 106 and 113 are multiplied by the weighting portions 109 and 116, and are then synthesized in the rake synthesizing portion 118 so that demodulated data 119 are obtained.

The synchronous detection and the weighting are multiplication processings, respectively. For this reason, a value may be obtained by multiplying the amount of a phase rotation by the weighted value in the phase estimating portions 106 and 113 and the calculation may be carried out at the same time.

In the case in which the receive data are stored in the state brought after the reverse diffusion, the input is switched from (1) to (N) by the finger for processing the selector 102 and the selectors 104, 107, 111 and 114 are switched to (2) respectively. At the same time that the receive data (the discrete data) are input, consequently, they are input to the reverse diffusing portions 105 and 112 through the selectors 107 and 114 and the reverse diffusing portions 105 and 112 reversely diffuse a pilot symbol and a data symbol. The pilot symbol is used for obtaining the amount of a phase rotation in the phase estimating portions 104 and 109.

At this time, the selector 102 is switched to (1) and (N) so that the data symbols output from the reverse diffusing portions 105 and 112 are stored in the storage memory 103 through the selector 102.

When the phase estimation and the weighted value are determined in the phase estimating portions 104 and 109, the data symbol is sequentially read from the storage memory 103 and the data symbol thus read and the amounts of a phase rotation of the fingers obtained in the phase estimating portions 106 and 113 are multiplied in the synchronous detecting portions 108 and 115, and furthermore, a result thus obtained is multiplied by the weighted values of the fingers obtained in the phase estimating portions 106 and 113 in the weighting portions 109 and 116, and the results obtained by the fingers are then synthesized in the rake synthesizing portion 118 so that the demodulated data 119 are obtained.

Figure 7:
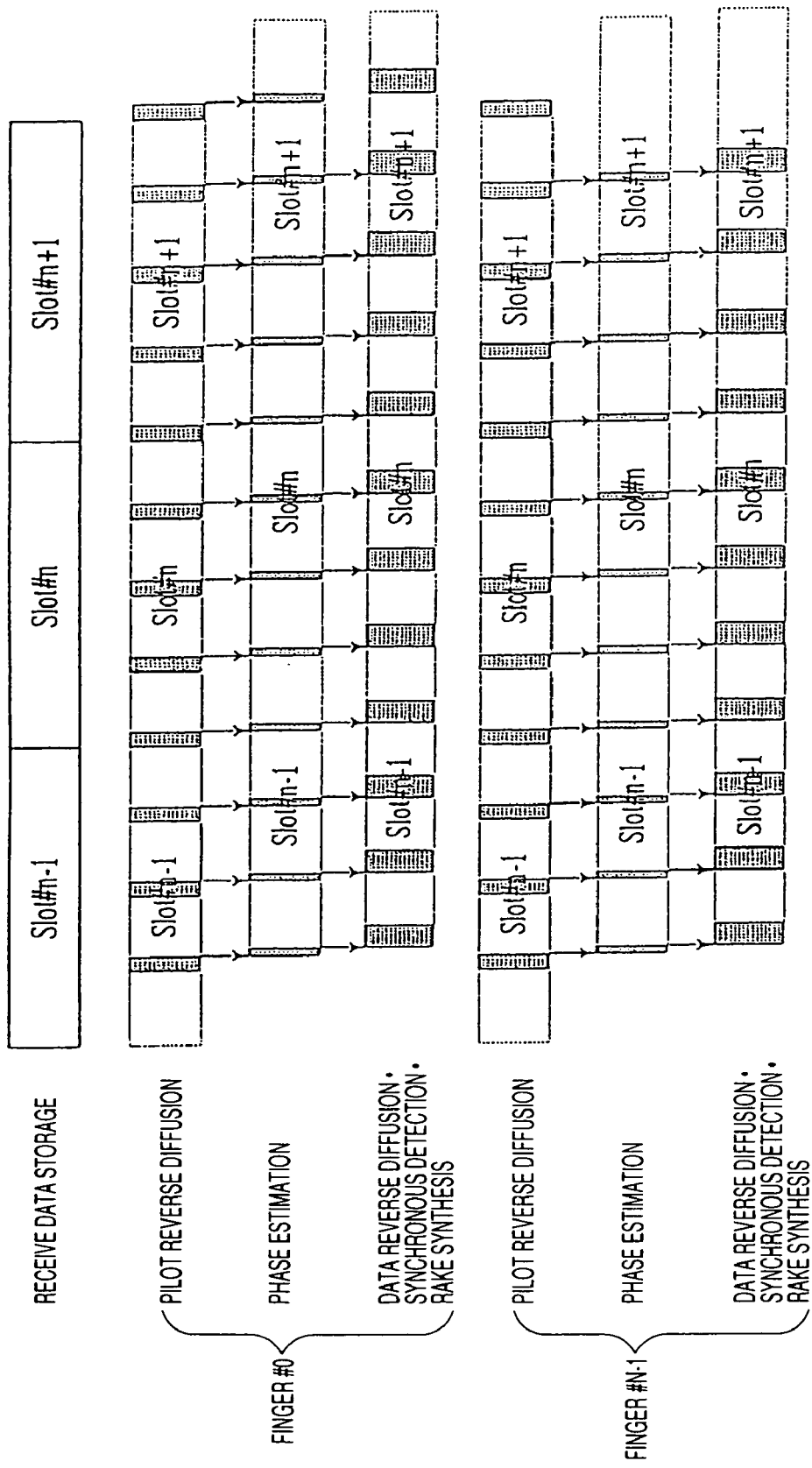
FIG. 7 is a timing chart showing an operation in the case in which receive data are stored in a state brought after a reverse diffusion according to the fifth embodiment of the invention.

FIG. 7 shows an operation timing in the case in which the storage is carried out in the state brought after the reverse diffusion. When the storage of the data in the storage memory 103 is completed, the pilot symbol is read from the memory 103 and is subjected to the reverse diffusion and the phase estimation in the reverse diffusing portions 105 and 112 and the phase estimating portions 106 and 113. Then, the data symbol is subjected to the reverse diffusion, the synchronous detection and the weighting calculation. In this case, it is not necessary to hold the symbol subjected to the reverse diffusion.

According to the receiving device in accordance with the fifth embodiment, the receive data requiring a large capacity with a low diffusion rate and a large number of fingers can be stored in the storage memory 103 in the state brought before the reverse diffusion, and the synchronous detection can be implemented in a constant memory capacity irrespective of the diffusion rate and the number of fingers.

In the case in which the data are lessened after the reverse diffusion, for example, the diffusion rate is high and the number of fingers is small, moreover, it is possible to decrease the number of times of access to the storage memory and the memories to be used and to reduce a consumed power by immediately carrying out the reverse diffusion without storing the receive data in the storage memory 103 and then storing the data symbol in the storage memory 103.

Sixth Embodiment

Figure 8:
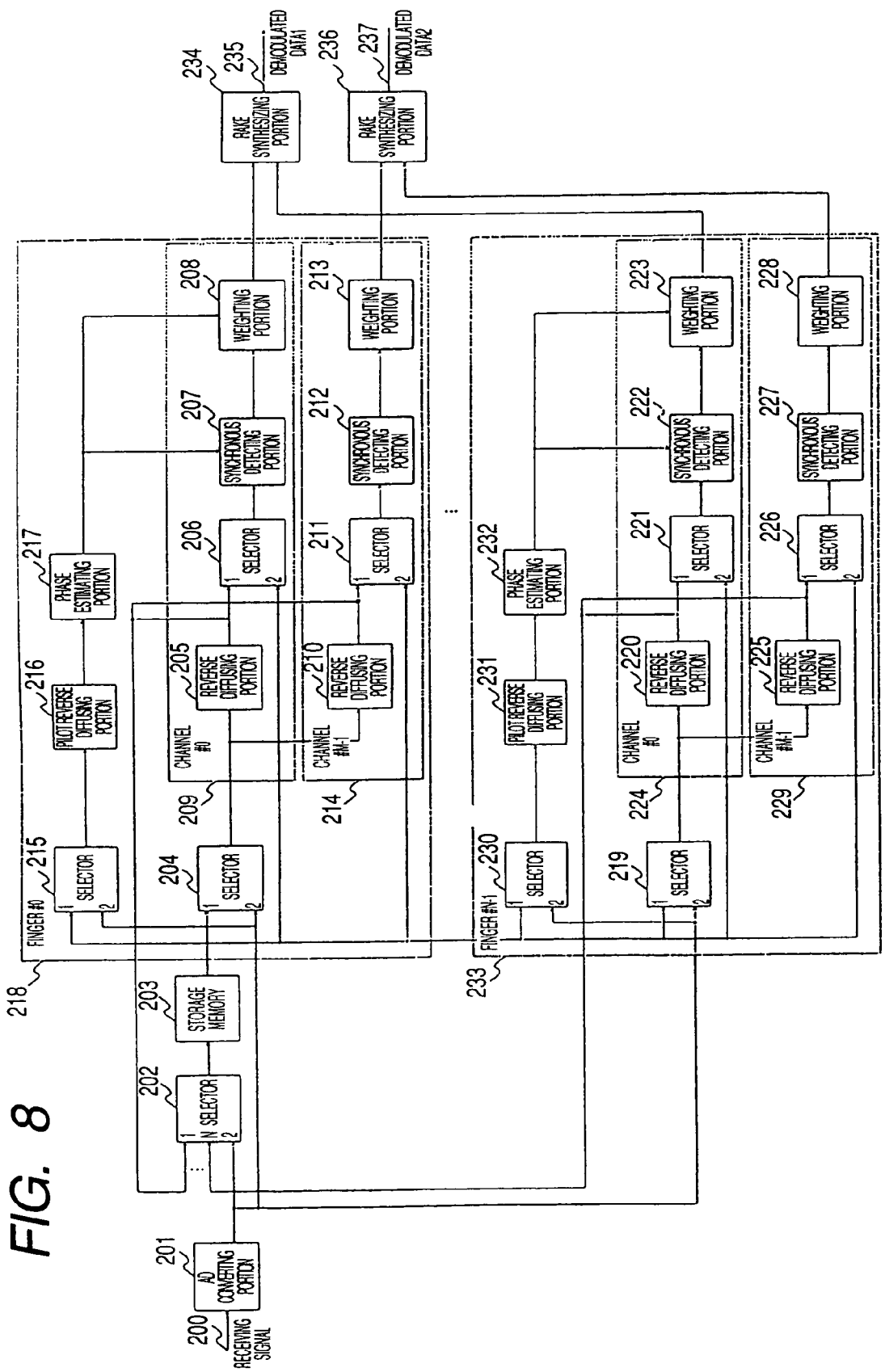
FIG. 8 is a block diagram showing the structure of a receiving device according to a sixth embodiment of the invention.

FIG. 8 is a block diagram showing the structure of a receiving device according to a sixth embodiment of the invention. The receiving device has an AD converting portion 201, a selector 202 for selecting a storage order for receive data, a storage memory 203, a finger unit 218 (#0), a finger unit 233 (#N−1), and rake synthesizing portions 234 and 236. In the receiving device, the number of fingers is N and N identical finger units are provided, and furthermore, the number of channels is M and M reverse diffusing portions, M synchronous detecting portions and M weighting portions are provided in the identical finger unit.

The finger unit 218 is constituted by a selector 204 for selecting the receive data to be diffused reversely, channel units 209 and 214, a selector 215, a pilot reverse diffusing portion 216, and a phase estimating portion 217. The finger unit 233 is constituted by a selector 219 for selecting the receive data to be diffused reversely, channel units 224 and 229, a selector 230, a pilot reverse diffusing portion 231, and a phase estimating portion 232.

The channel unit 209 is constituted by a reverse diffusing portion 205, a selector 206 for selecting data to be detected synchronously, a synchronous detecting portion 207 and a weighting portion 208, and the channel unit 214 is constituted by a reverse diffusing portion 210, a selector 211 for selecting data to be detected synchronously, a synchronous detecting portion 212 and a weighting portion 213. The channel unit 224 is constituted by a reverse diffusing portion 220, a selector 221 for selecting data to be detected synchronously, a synchronous detecting portion 222 and a weighting portion 223, and the channel unit 229 is constituted by a reverse diffusing portion 225, a selector 226 for selecting data to be detected synchronously, a synchronous detecting portion 227 and a weighting portion 228.

Figure 9:
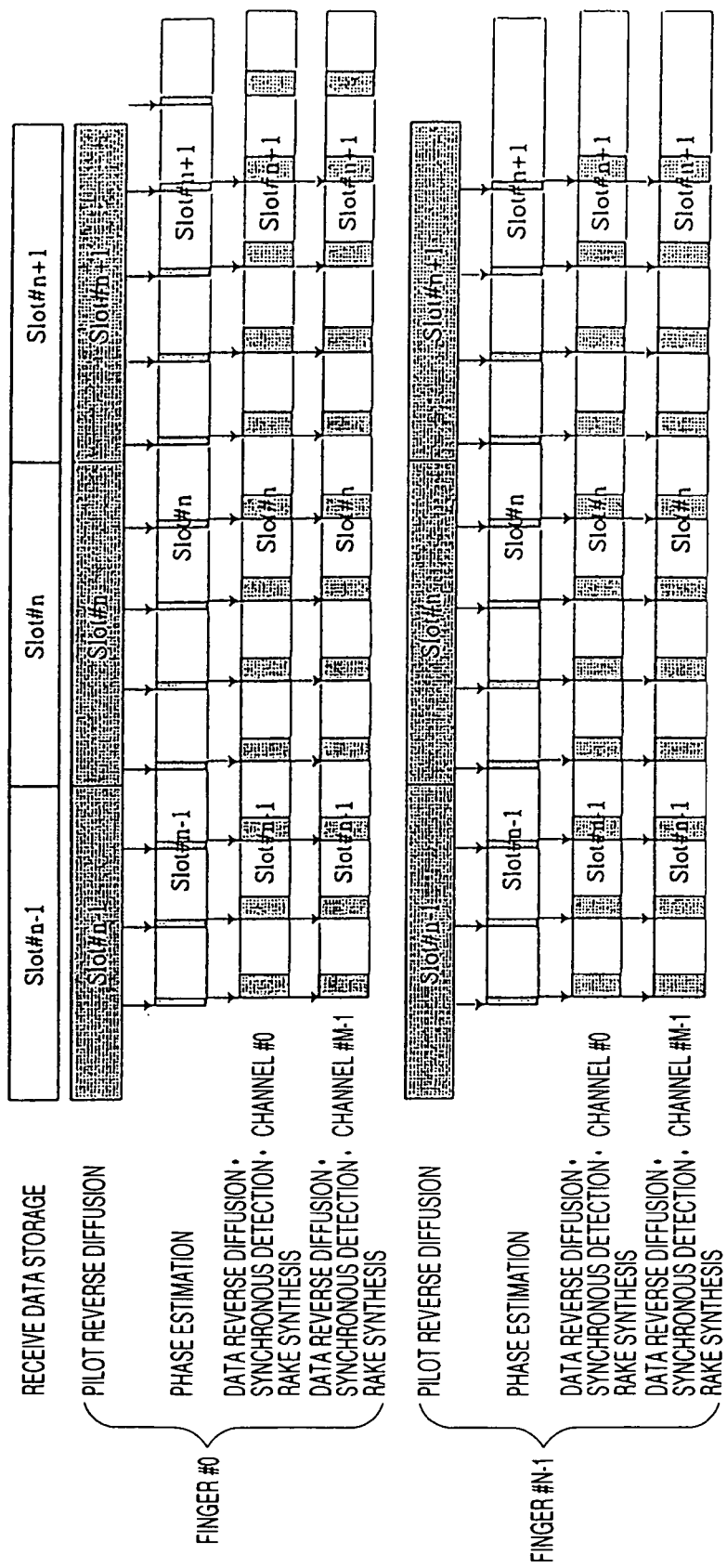
FIG. 9 is a timing chart showing an operation in the case in which receive data are stored in a state brought after a reverse diffusion according to the sixth embodiment of the invention.

Next, an operation according to the embodiment will be described with reference to an operation timing chart of FIG. 9. After a receiving signal 200 is converted into discrete data by the AD converting portion 201, the discrete data are stored in the storage memory 203 through the selector 202 or are input to the reverse diffusing portions 205, 210, 216, 220, 225 and 231 through the selectors 204, 215, 219 and 230.

The selector 202 is switched to an input (0) and the selectors 215 and 230 are set to an input (2). The receive data output from the AD converting portion 201 are stored in the storage memory 203 through the selector 202. At the same time, the receive data are input to the pilot reverse converting portion 216 through the selector 215 and a pilot symbol is then diffused reversely, and a phase estimation is carried out by the phase estimating portion 217 using the pilot symbol thus obtained.

When the receive data corresponding to necessary symbols for the phase estimation are gathered perfectly, thereafter, the receive data read from the storage memory 203 through the selectors 204 and 219 switched to 1 are input to the reverse diffusing portions 205, 210, 220 and 225. Therefore, these reverse diffusing portions reversely diffuse a data symbol (an object to be detected synchronously), and the amounts of a phase rotation of the fingers which are obtained in the phase estimating portions 217 and 232 are multiplied in the synchronous detecting portions 207, 212, 222 and 227 and the weighted values of the fingers which are obtained in the phase estimating portions 217 and 232 are multiplied in the weighting portions 208, 213, 223 and 228, and a synthesis is then carried out in the rake synthesizing portions 234 and 236 so that demodulated data 235 and 237 are obtained.

On the other hand, in the case in which a diffusion rate is high or the number of receiving channels is small, the selectors 204, 206, 211, 219, 221 and 226 are switched to the input (2) respectively and the receive data are diffused reversely, and the data symbol is then stored in the storage memory 203.

According to the receiving device in accordance with the sixth embodiment, the storage and reverse diffusion of the pilot symbol for calculating a phase estimation value can be controlled independent of the data symbol as described above. Consequently, it is possible to reduce the storage memory 203 in a CDMA system having a low diffusion rate, other channels and other fingers (see FIG. 27). The condition for estimating the memory reducing effect is based on an HSDPA method to be the improved standard of a W-CDMA method. The receive data are converted into reverse diffused data corresponding to the number of fingers by the reverse diffusion. In addition to an increase in amplitude information, the number of channels for carrying out a receipt at the same time is increased. Consequently, a large number of memories are required. In the embodiment, however, it is possible to reduce the storage memory 203 for the synchronous detection.

Seventh Embodiment

Figure 10:
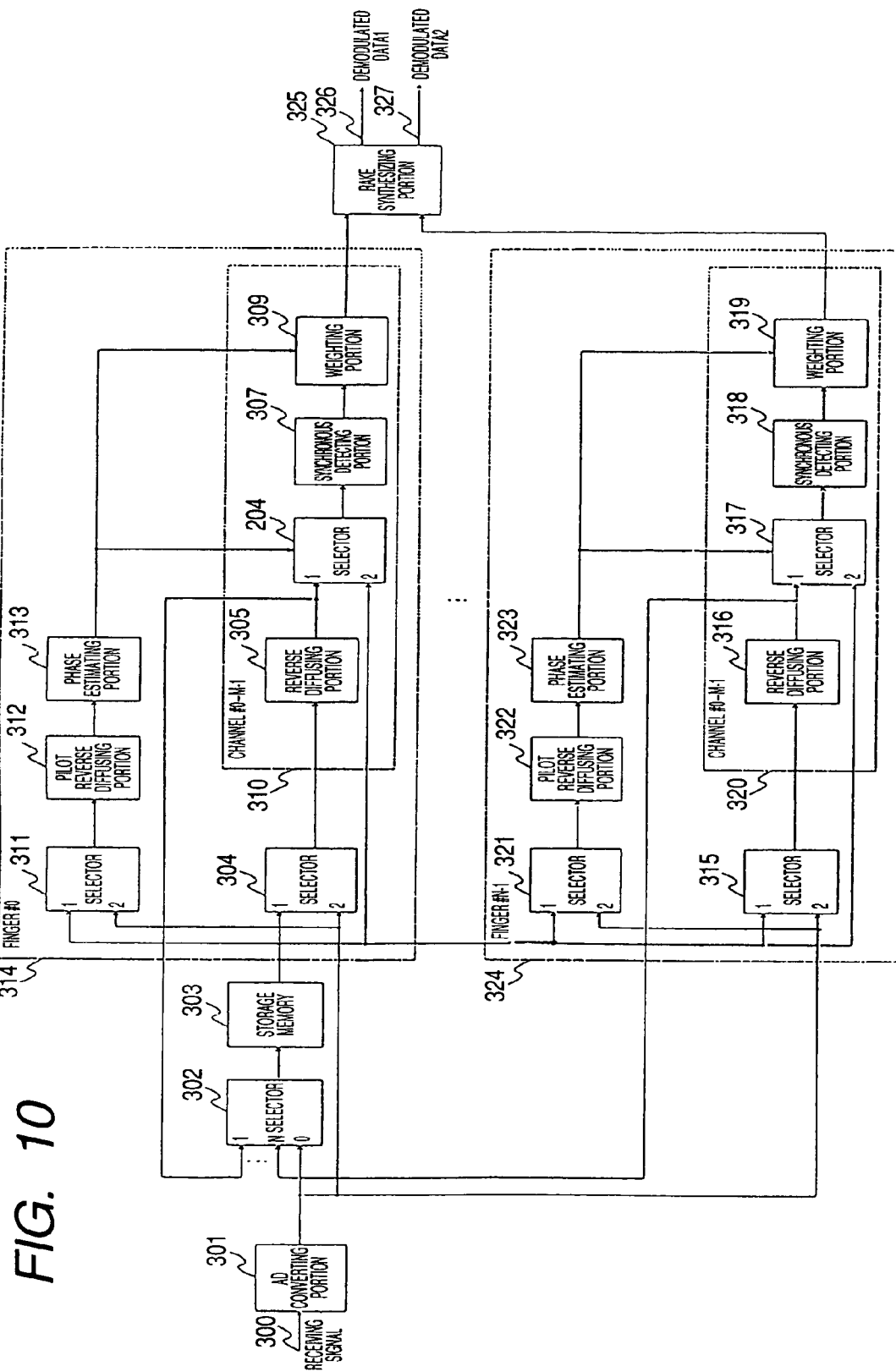
FIG. 10 is a block diagram showing the structure of a receiving device according to a seventh embodiment of the invention.

FIG. 10 is a block diagram showing the structure of a receiving device according to a seventh embodiment of the invention. The receiving device has an AD converting portion 301, a selector 302 for selecting a storage order for receive data, a storage memory 303, a finger unit 314 (#0), a finger unit 324 (#N−1), and a rake synthesizing portion 325. In the receiving device, the number of fingers is N and N identical finger units are provided. Moreover, the number of channels is M and a set of reverse diffusing portions 305 and 316, a set of selectors 304 and 317, a set of synchronous detecting portions 307 and 318, and a set of weighting portions 308 and 319 are provided in the fingers, and a plurality of channels is processed by using a reverse diffusing portion, a synchronous detecting portion and a weighting portion. The embodiment is characterized in that a reverse diffusing portion, a synchronous detecting portion and a weighting portion are used for a plurality of channels, and other structures are the same as those in the sixth embodiment.

Figure 11:
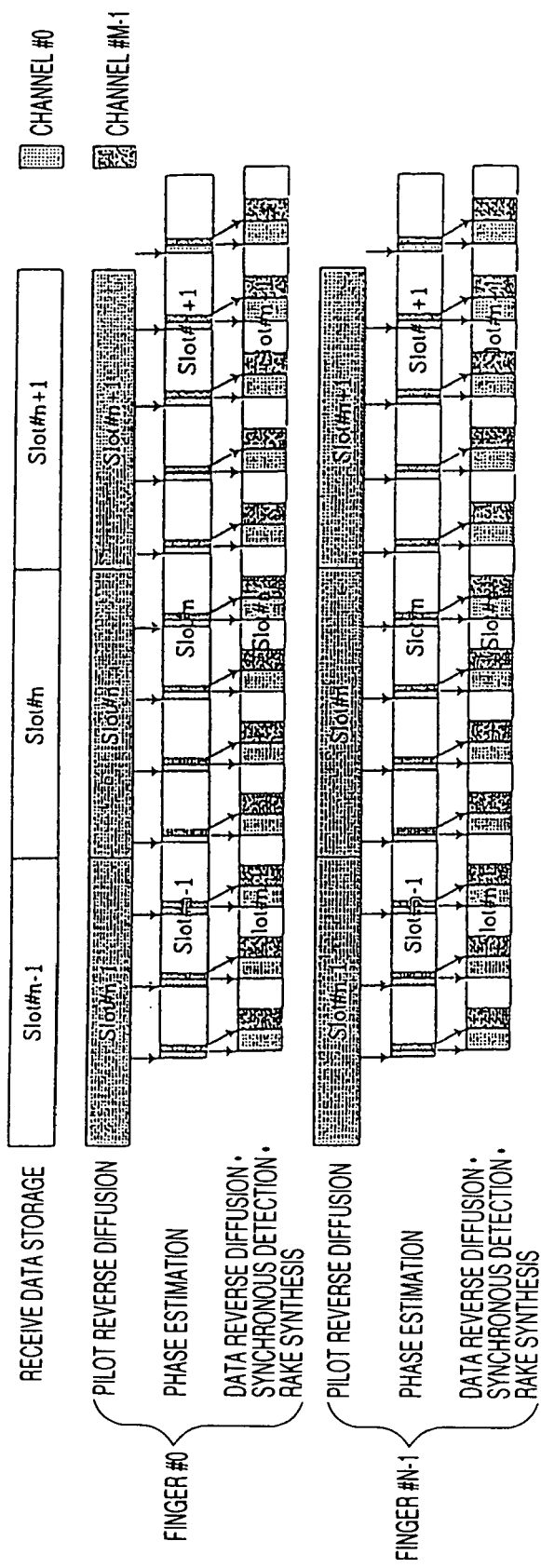
FIG. 11 is a timing chart showing an operation in the case in which receive data are stored in a state brought after a reverse diffusion according to the seventh embodiment of the invention.

Next, an operation according to the embodiment will be described with reference to an operation timing chart of FIG. 11. The selector 302 is switched to an input (0) and selectors 311 and 321 are set to an input (2). A receiving signal 300 is converted into discrete data by the AD converting portion 301 and the discrete data are stored in the storage memory 303 through the selector 302. At the same time, the receive data are input to pilot reverse converting portions 312 and 322 through the selectors 311 and 321 and a pilot symbol is then diffused reversely, and a phase estimation is carried out by phase estimating portions 313 and 323 using the pilot symbol thus obtained.

A flow to the phase estimation is the same as that in the sixth embodiment. After the phase estimation is carried out, the receive data are read from the storage memory 303 through the selectors 304 and 315 having the input switched to (1) and are reversely diffused in the reverse diffusing portions 312 and 322, and a reverse diffusion in the reverse diffusing portions 305 and 316, a synchronous detection in the synchronous detecting portions 307 and 318, and a weighting processing in the weighting portions 308 and 319 are sequentially carried out in time series corresponding to a plurality of channels of 0 to M−1 by using the amounts of a phase rotation and the weighted values which are estimated by the phase estimating portions 313 and 323.

According to the receiving device in accordance with the seventh embodiment, the reverse diffusing portions 305 and 316, the synchronous detecting portions 307 and 318, and the weighting portions 308 and 319 can be shared between the channels. Therefore, it is possible to reduce the scale of the circuit. In order to share the circuit, it is necessary to control a calculation order. In a processing to carry out a real-time processing as in a radio communication, the control tends to be complicated. By storing the receive data in the storage memory 303 in a state brought before the reverse diffusion as in the embodiment, however, a degree of freedom can be generated in the processing timing of the reverse diffusion processing and the circuit can also be shared easily.

Eighth Embodiment

Figure 12:
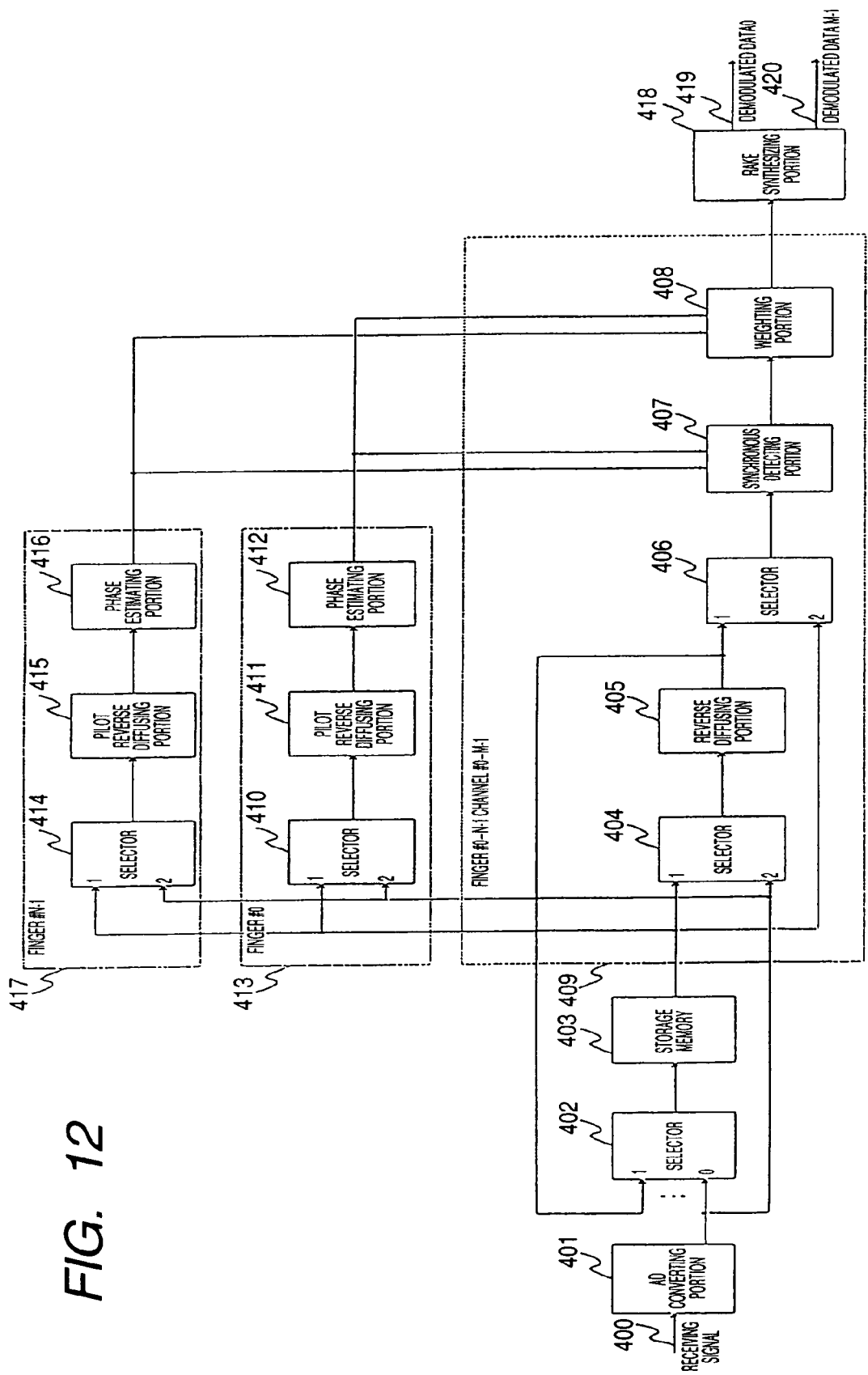
FIG. 12 is a block diagram showing the structure of a receiving device according to an eighth embodiment of the invention.

FIG. 12 is a block diagram showing the structure of a receiving device according to an eighth embodiment of the invention. The receiving device has an AD converting portion 401, a selector 402 for selecting a storage order for receive data, a storage memory 403, a finger unit 409 which is common to fingers (from #0 to #N−1), a finger unit 413 (#0), a finger unit 417 (#N−1), and a rake synthesizing portion 418. The finger unit 409 (from #0 to #N−1) has a selector 404, a reverse diffusing portion 405, a selector 406, a synchronous detecting portion 407 and a weighting portion 408, and carries out a common processing to each of the fingers of #0 to #N−1. The finger unit 413 (#0) has a selector 410, a pilot reverse diffusing portion 411 and a phase estimating portion 412, and the finger unit 417 (#N−1) has a selector 414, a pilot reverse diffusing portion 415 and a phase estimating portion 416. In the receiving device, the number of fingers is N. The embodiment is characterized in that a plurality of fingers is processed by using an identical circuit in the finger unit 409. Moreover, the number of channels is M, and the embodiment is characterized in that a reverse diffusion, a synchronous detection and a weighting are carried out by using an identical circuit in the same finger.

Figure 13:
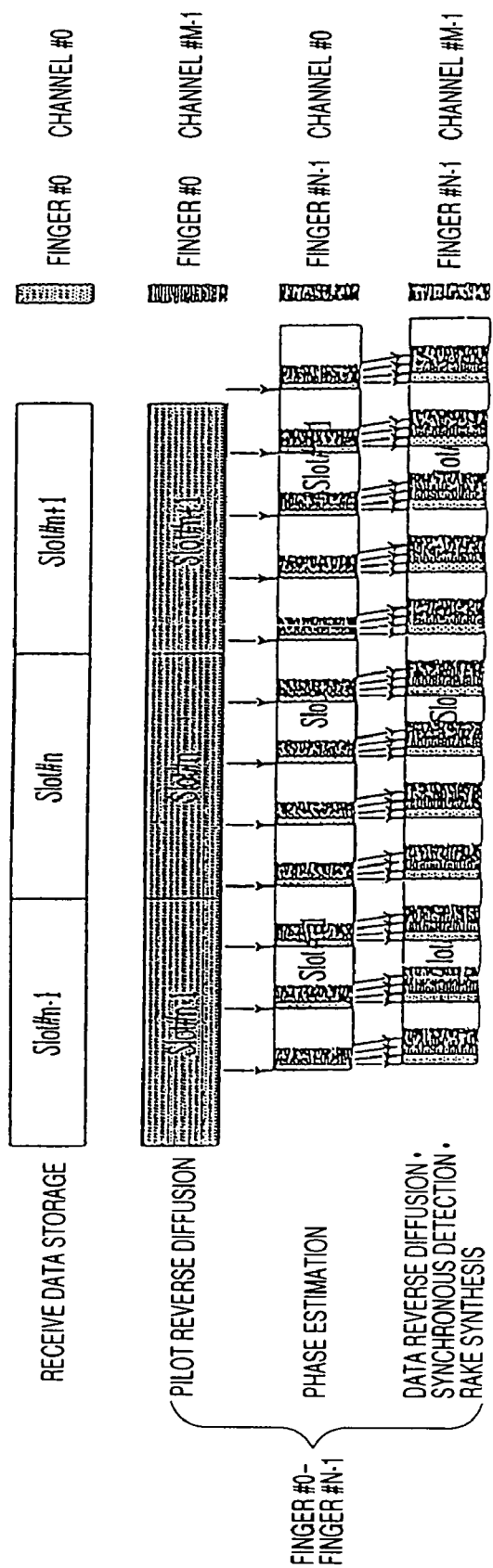
FIG. 13 is a timing chart showing an operation in the case in which receive data are stored in a state brought after a reverse diffusion according to the eighth embodiment of the invention.

Next, an operation according to the embodiment will be described with reference to an operation timing chart of FIG. 13. The selector 402 is switched to an input (0) and selectors 414 and 410 are set to an input (2). A receiving signal 400 is converted into discrete data by the AD converting portion 402 and the discrete data are stored in the storage memory 403 through the selector 402. At the same time, the receive data are input to pilot reverse converting portions 411 and 413 through the selectors 410 and 414 and a pilot symbol is then diffused reversely, and a phase estimation is carried out by the phase estimating portions 412 and 416 using the pilot symbol thus obtained.

A flow to the phase estimation is the same as that in the sixth and seventh embodiments. After the phase estimation is carried out, the receive data are read from the storage memory 403 through the selector 404 having the input switched to (1) and are reversely diffused in the reverse diffusing portion 405, and a synchronous detection is carried out by using the amounts of a phase rotation and weighted values of the phase estimating portions 412 and 416 of the fingers in the synchronous detecting portion 407 and a weighting is performed in the weighting portion 408. A plurality of channels and a plurality of fingers are sequentially processed in time series.

According to the receiving device in accordance with the eighth embodiment, the reverse diffusing portion 405, the synchronous detecting portion 407, and the weighting portion 408 can be shared between the fingers and between the channels. Therefore, it is possible to reduce the scale of the circuit. In order to share the circuit, it is necessary to control a calculation order. In a processing to carry out a real-time processing as in a radio communication, the control tends to be complicated. By storing the receive data in the storage memory 403 in a state brought before the reverse diffusion as in the embodiment, however, a degree of freedom can be generated in the processing timing of the reverse diffusion processing and the circuit can also be shared easily so that the scale of the circuit can be reduced.

Ninth Embodiment

Figure 14:
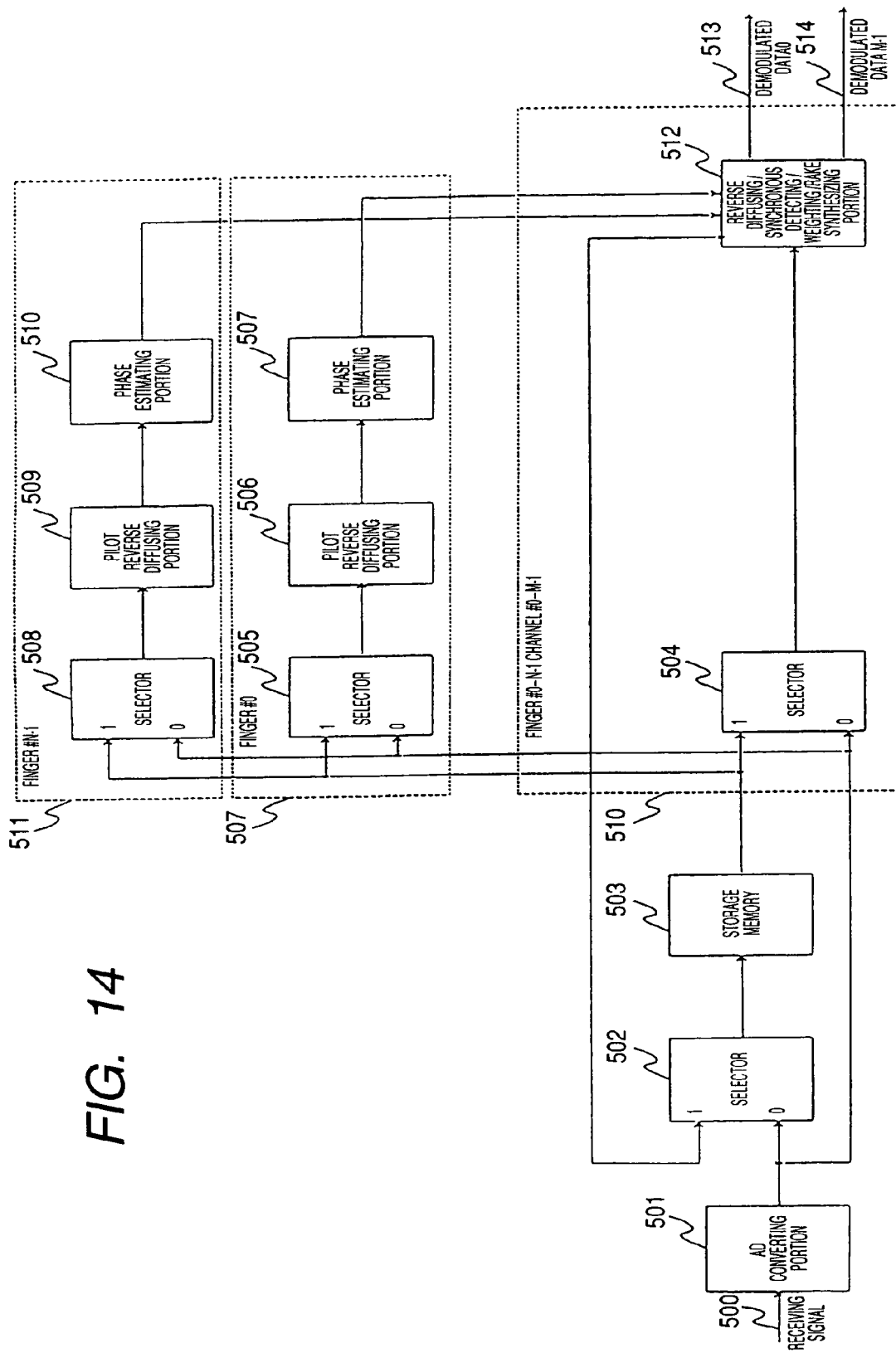
FIG. 14 is a block diagram showing the structure of a receiving device according to a ninth embodiment of the invention.

FIG. 14 is a block diagram showing the structure of a receiving device according to a ninth embodiment of the invention. The receiving device has an AD converting portion 501, a selector 502 for selecting a storage order for receive data, a storage memory 503, a finger unit 507 (#0), a finger unit 510 which is common to each of fingers and channels (from #0 to #N−1 and from #0 to #M−1), and a finger unit 511 (#N−1).

The finger unit 510 (from #0 to #N−1 and from #0 to #M−1) has a selector 504 and a reverse diffusing/synchronous detecting/weighting/rake synthesizing portion 512, and carries out a common processing to each of the fingers and channels from #0 to #N−1 and from #0 to #M−1. The finger unit 507 (#0) has a selector 505, a pilot reverse diffusing portion 506 and a phase estimating portion 507, and the finger unit 511 (#N−1) has a selector 508, a pilot reverse diffusing portion 509 and a phase estimating portion 510. In the receiving device, the number of the fingers is N and the number of the channels is M. The embodiment is characterized in that the reverse diffusion, synchronous detection, weighting and rake synthesis processings are carried out at the same time in the reverse diffusing/synchronous detecting/weighting/rake synthesizing portion 512.

Next, description will be given to an operation according to the embodiment. The selector 502 is switched to an input (0) and the selectors 505 and 508 are set to an input (2). A receiving signal 500 is converted into discrete data by the AD converting portion 501 and the discrete data are stored in the storage memory 503 through the selector 502. At the same time, the receive data are input to the pilot reverse converting portions 506 and 509 through the selectors 505 and 508 and a pilot symbol is then diffused reversely, and a phase estimation is carried out by the phase estimating portions 507 and 510 using the pilot symbol thus obtained.

A flow to the phase estimation is the same as that in the eighth embodiment. After the phase estimation is carried out, the receive data are read from the storage memory 503 through the selector 504 having the input switched to (1) and are input to the reverse diffusing/synchronous detecting/weighting/rake synthesizing portion 512, thereby performing a common processing to each of the fingers and channels at the same time.

The reverse diffusion processing is a product sum calculation processing, the synchronous detection processing is a multiplication processing, the weighting processing is a multiplication processing, and the rake synthesis processing is an addition processing, and all of them are linear calculations. Therefore, it is possible to carry out a change in a calculation order and a multiplication at a time.

According to the receiving device in accordance with the ninth embodiment, the receive data are stored in the storage memory 503 as they are. Therefore, the calculation order can easily be changed. Although the number of bits of a diffusion code, a phase rotation value and a weighted value are varied depending on an application to be utilized, therefore, it is possible to determine the calculation order in consideration of a performance, the scale of a circuit and a time required for a processing, thereby carrying out a common processing to the fingers and channels at the same time. Thus, a degree of freedom of a processing timing in the reverse diffusion processing can be generated and the circuit can also be shared easily so that the scale of the circuit can be reduced.

Tenth Embodiment

Figure 15:
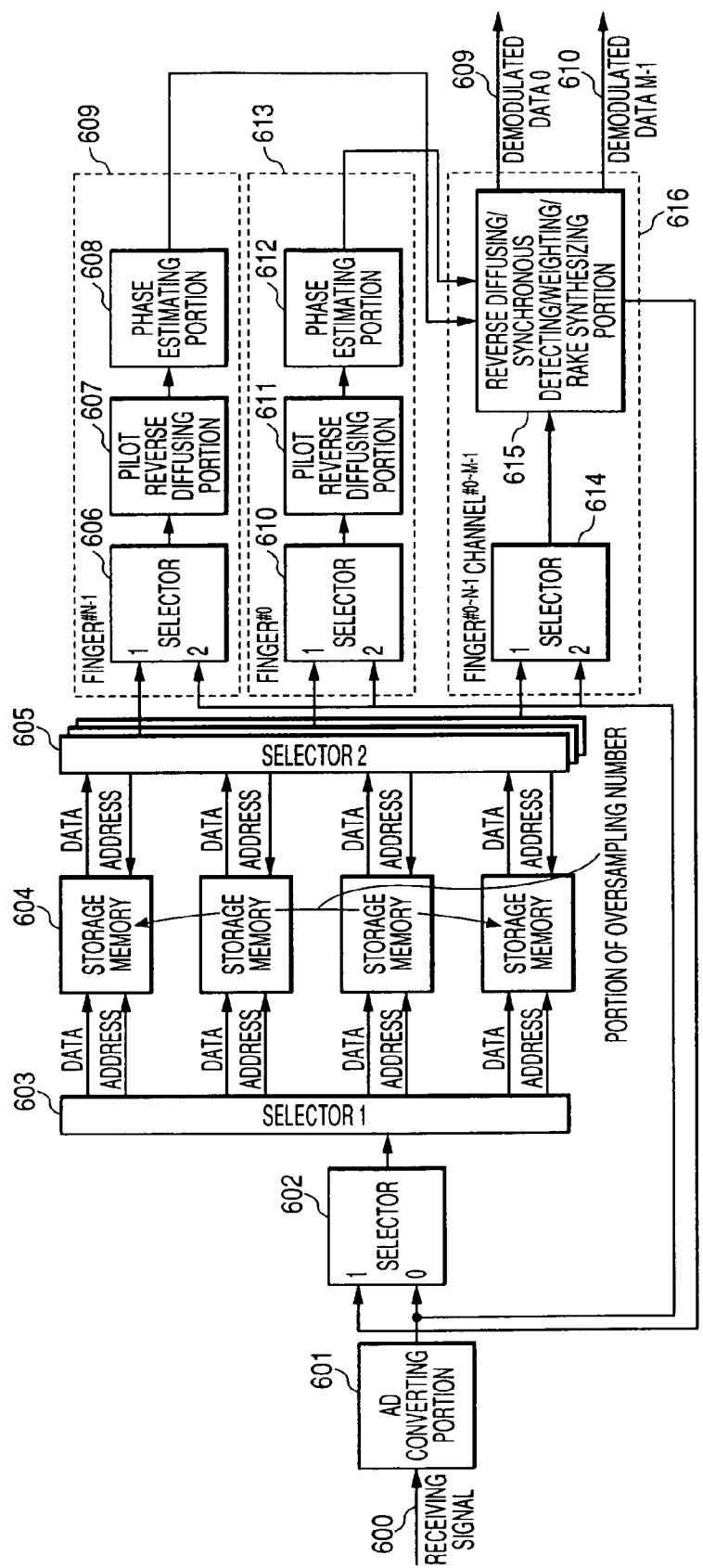
FIG. 15 is a diagram showing the structure of a receiving device according to a tenth embodiment of the invention.

FIG. 15 is a diagram showing the structure of a receiving device according to a tenth embodiment of the invention. The receiving device has an AD converting portion 601, a selector 602, a selector 603, a plurality of storage memories (1) to (4) 604, a selector 605, a finger unit 609 (#N−1), a finger unit 613 (#0), and a finger unit 616 (#0) which is common to each of fingers and channels (from #0 to #N−1 and from #0 to #M−1).

The finger unit 616 (from #0 to #N−1 and from #0 to #M−1) has a selector 614 and a reverse diffusing/synchronous detecting/weighting/rake synthesizing portion 615, and carries out a common processing to each of the fingers and the channels from #0 to #N−1 and from #0 to #M−1. The finger unit 609 (#N−1) has a selector 606, a pilot reverse diffusing portion 607 and a phase estimating portion 608, and the finger unit 613 (#0) has a selector 610, a pilot reverse diffusing portion 611 and a phase estimating portion 612.

The structure according to the embodiment applies correspondingly to the structure according to the ninth embodiment and is characterized in that the number of the storage memories 604 for storing the receive data is an oversampling degree or two or more.

Next, description will be given to an operation according to the embodiment. The selector 602 is switched to an input (0) and the selectors 609 and 613 are set to an input (2). A receiving signal 600 is converted into discrete data by the AD converting portion 601 and the discrete data are transferred through the selector 602, and furthermore, are distributed every sample by the selector 603 and are stored in any of the storage memories 604 (1) to (4). At the same time, the receive data are input to the pilot reverse converting portions 607 and 611 through the selectors 606 and 610 and a pilot symbol is then diffused reversely, and a phase estimation is carried out by the phase estimating portions 608 and 612 using the pilot symbol thus obtained.

A CDMA receiving device carries out oversampling which is approximately several times as high as a determined chip rate (a cycle for sending a diffusion code), and regulates a receipt timing in a sample cycle, thereby performing the reverse diffusion processing in an accurate timing. In that case, in a specific finger, the receive data are required in only a chip rate cycle. Therefore, a plurality of storage memories 604(1) to (4) corresponding to the oversampling degree is prepared and data are stored in the separate storage memories 604 by the selector 603 every sample.

In the subsequent reverse diffusion processing, the selector 614 is switched to an input (1), and furthermore, the selector 605 is switched every finger in such a manner that the sample required for each finger can be read. Then, the receive data are read from the storage memories 604 (1) to (4) at the same time so that desirable receive data are supplied to each finger. In the case in which a pass offset is great, the operation timing of the reverse diffusion processing is shifted.

The receiving device according to the tenth embodiment is intended for decreasing an access speed for the storage memories 604 (1) to (4) for the reverse diffusion processing and reducing the processing speed of an arithmetic unit. For this reason, the receive data corresponding to the number of oversamples are read through the selector 605 from the storage memories 604 (1) to (4) at the same time. Consequently, the access speed of the memory and the operation speed of an arithmetic unit for the reverse diffusion can be decreased to a chip rate. Thus, the consumed power of a circuit can be reduced and a clock management can easily be carried out.

Eleventh Embodiment

Figure 16:
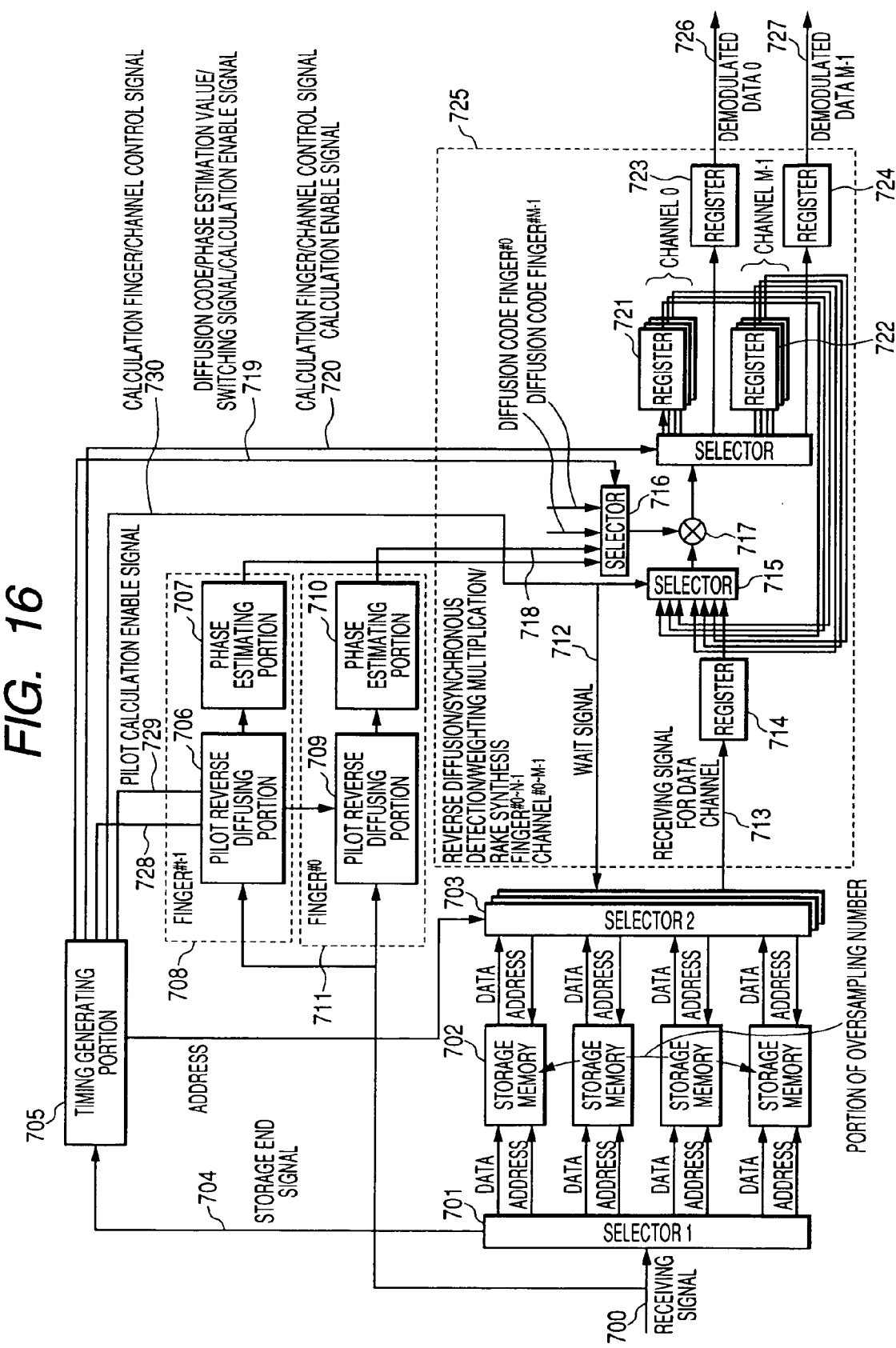
FIG. 16 is a diagram showing the structure of a receiving device according to an eleventh embodiment of the invention.

FIG. 16 is a diagram showing the structure of a receiving device according to an eleventh embodiment of the invention. The receiving device has a selector 701, a selector 703, a plurality of storage memories (1) to (4) 702, a finger unit 708 (#N−1), a finger unit 711, and a finger unit 725 which is common to each of fingers and channels (from #0 to #N−1 and from #0 to #M−1). The finger unit 725 (from #0 to #N−1 and from #0 to #M−1) constitutes a reverse diffusing/synchronous detecting/weighting/rake synthesizing portion by a register 714, selectors 715a, 715b and 716, registers 721, 722, 723 and 724, and a multiplier 717, and carries out a common processing to the fingers and channels from #0 to #N−1 and from #0 to #M−1. The finger unit 708 (#N−1) has a pilot reverse diffusing portion 706 and a phase estimating portion 707, and the finger unit 711 (#0) has a pilot reverse diffusing portion 709 and a phase estimating portion 710. The structure according to the embodiment applies correspondingly to the structure according to the tenth embodiment and is characterized in that a timing generating portion 705 is provided as common memory address generating means in relation to a method of controlling a calculation after the reverse diffusion processing. The timing generating portion 705 outputs a storage end signal 704 to the register 701, pilot calculation enable signals 728 and 729 to the pilot reverse diffusing portions 706 and 709, a diffusion code/phase estimation value switching signal calculation enable signal 719 to the selector 716, a calculation finger/channel control signal calculation enable signal 720 to the selector 715b, and a wait signal 712 to the selector 703.

Figure 17:
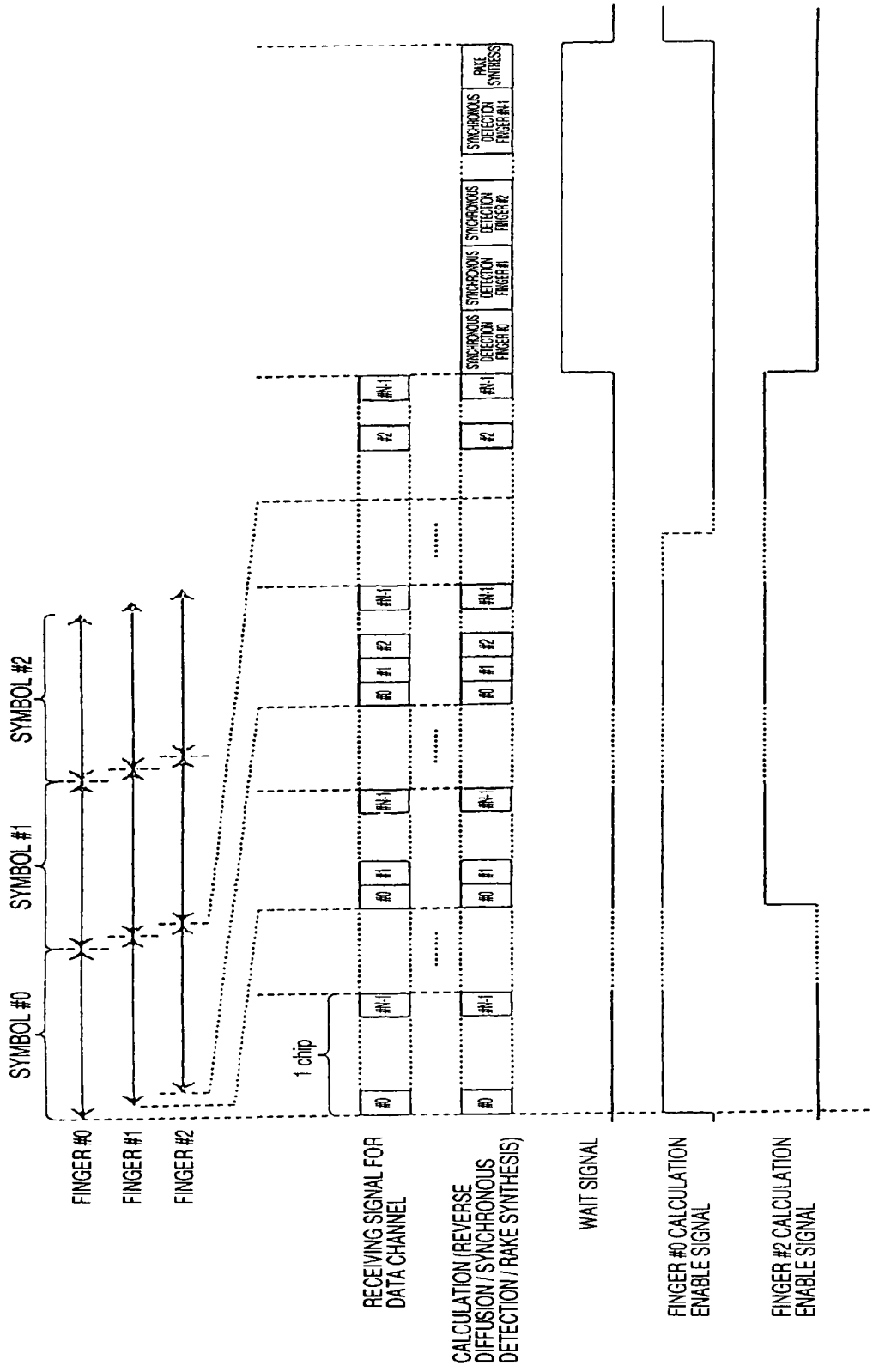
FIG. 17 is a timing chart showing an operation in the case in which receive data are stored in a state brought after a reverse diffusion according to the eleventh embodiment of the invention.

Next, an operation according to the embodiment will be described with reference to an operation timing chart of FIG. 17. A receiving signal 700 converted into discrete data is distributed every sample by the selector 701 and the discrete data are stored in any of the storage memories 702 (1) to (4). At the same time, the receive data are input to the pilot reverse converting portions 706 and 709. When the timing generating portion 705 outputs the pilot calculation enable signals 728 and 729 to the pilot reverse diffusing portions 706 and 709, a pilot symbol is reversely diffused by the pilot reverse converting portions 706 and 709 so that a phase estimation value and a weighted value are calculated in the phase estimating portions 707 and 710 by using the pilot symbol thus obtained.

On the other hand, when the receive data are stored corresponding to a desirable time in the storage memory 702, the storage end signal 704 is input to the timing generating portion 705. At this time, a phase estimation has been ended in the phase estimating portions 707 and 710. The timing generating portion 705 sequentially issues an address to the storage memory 702, and necessary data for each reverse diffusion processing are selected by the selector 703 and are then output as a data channel receiving signal 713 to the finger (from #0 to #N−1 and from #0 to #M−1) 725.

In the reverse diffusing portion of the finger (from #0 to #N−1 and from #0 to #M−1) 725, the receive data thus input are multiplied by a diffusion code corresponding to the receipt timing of each finger and the intermediate result of an integral is stored in the registers 721 and 722 for each finger and channel, and the reverse diffusion processing is carried out up to a specific symbol boundary while sequentially reading the receive data from the storage memory 702. For the symbol data of each finger, a phase estimation value and a weighted value are multiplied and the symbol value of each finger is added (rake synthesized) in the registers 723 and 724, and demodulated data 726 and 727 are output.

Thus, the embodiment is characterized in that the receive data stored in the storage memory 702 are read continuously by the control of the timing generating portion 705 to be the common address generating means, and furthermore, the reverse diffusing portion of the finger (from #0 to #N−1 and from #0 to #M−1) 725 correspondingly diffuses the receive data reversely.

Moreover, a processing is carried out in time sharing after the reverse diffusion processing of each finger. Therefore, the same receive data are used in 2 cycles or more. Moreover, the reverse diffusion processing cannot be performed in a synchronous detection and a rake synthesis. In that case, therefore, the wait signal 712 is output from the timing generating portion 705 to the selector 703 for controlling the memory read of the storage memory 702, thereby interrupting the read from the storage memory 702 temporarily. In accordance with the sixth and seventh embodiments, this portion can include a plurality of calculating means and can also have the structure of a circuit which does not generate a wait.

According to the receiving device in accordance with the eleventh embodiment, the read of the receive data from the storage memory 702 is intensively managed in the timing generating portion 705. Consequently, it is easy to read the receive data and to control the reverse diffusion processing of each finger.

Twelfth Embodiment

Figure 18:
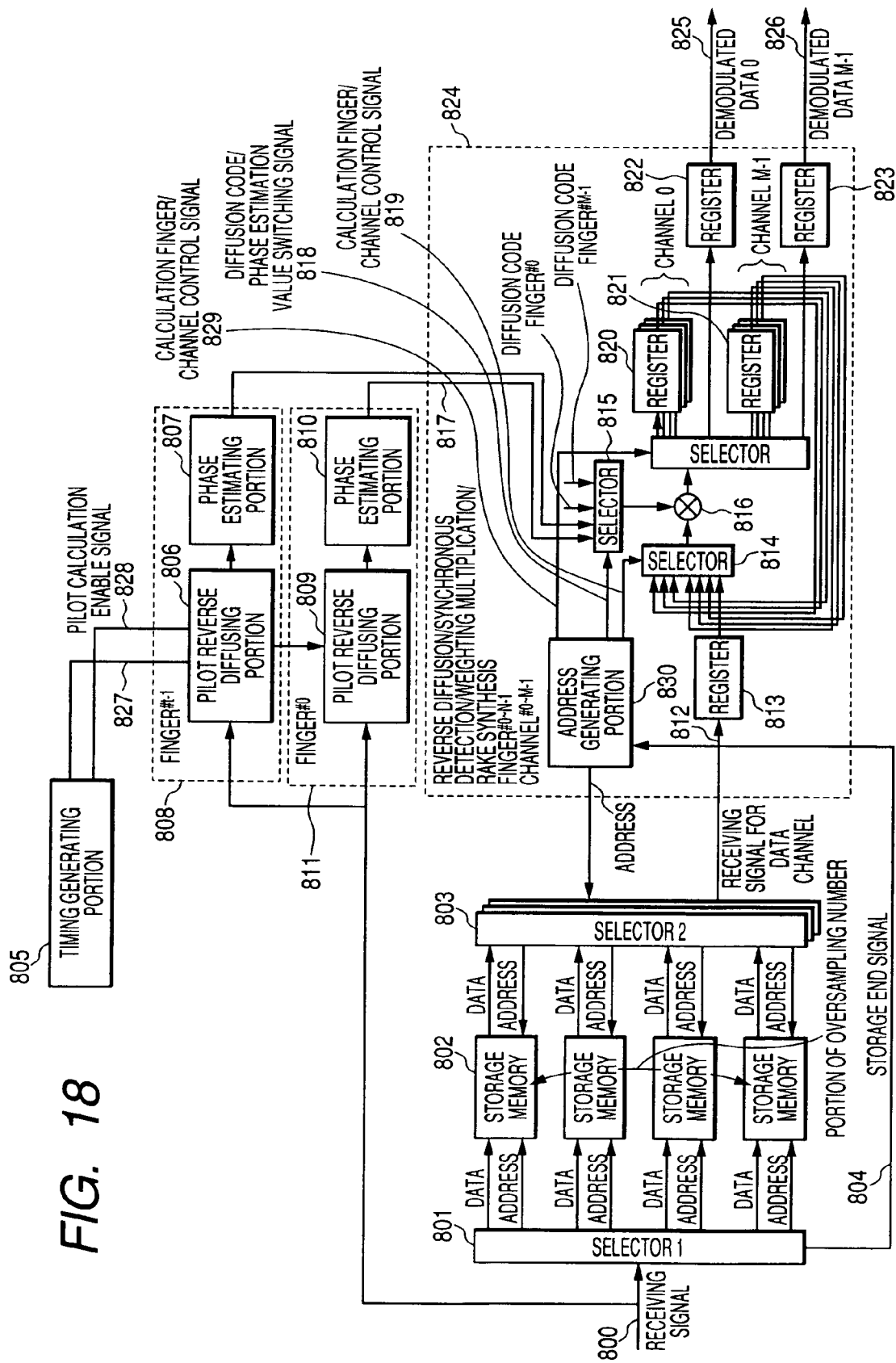
FIG. 18 is a block diagram showing the structure of a receiving device according to a twelfth embodiment of the invention.

FIG. 18 is a block diagram showing the structure of a receiving device according to a twelfth embodiment of the invention. The receiving device has a selector 801, a selector 803, a plurality of storage memories (1) to (4) 802, a finger unit 811 (#0), a finger unit 808 (#N−1), a finger unit 824 which is common to each of fingers and channels (from #0 to #N−1 and from #0 to #M−1), and a timing generating portion 805. The finger unit 824 (from #0 to #N−1 and from #0 to #M−1) constitutes a multiplier 816 and a reverse diffusing/synchronous detecting/weighting/rake synthesizing portion by a register 813, selectors 814a, 814b and 817, registers 820 and 821, and registers 822 and 823, and includes an address generating portion 830 and carries out a common processing to the fingers and channels from #0 to #N−1 and from #0 to #M−1.

The finger unit 808 (#N−1) has a pilot reverse diffusing portion 806 and a phase estimating portion 807, and the finger unit 811 (#0) has a pilot reverse diffusing portion 809 and a phase estimating portion 810, and the structure applies correspondingly to the structure according to the eleventh embodiment and the embodiment is characterized in that each reverse diffusing portion has the address generating portion 830 to be address generating means for the storage memory 820 in relation to a method of controlling a calculation after the reverse diffusion processing.

Figure 19:
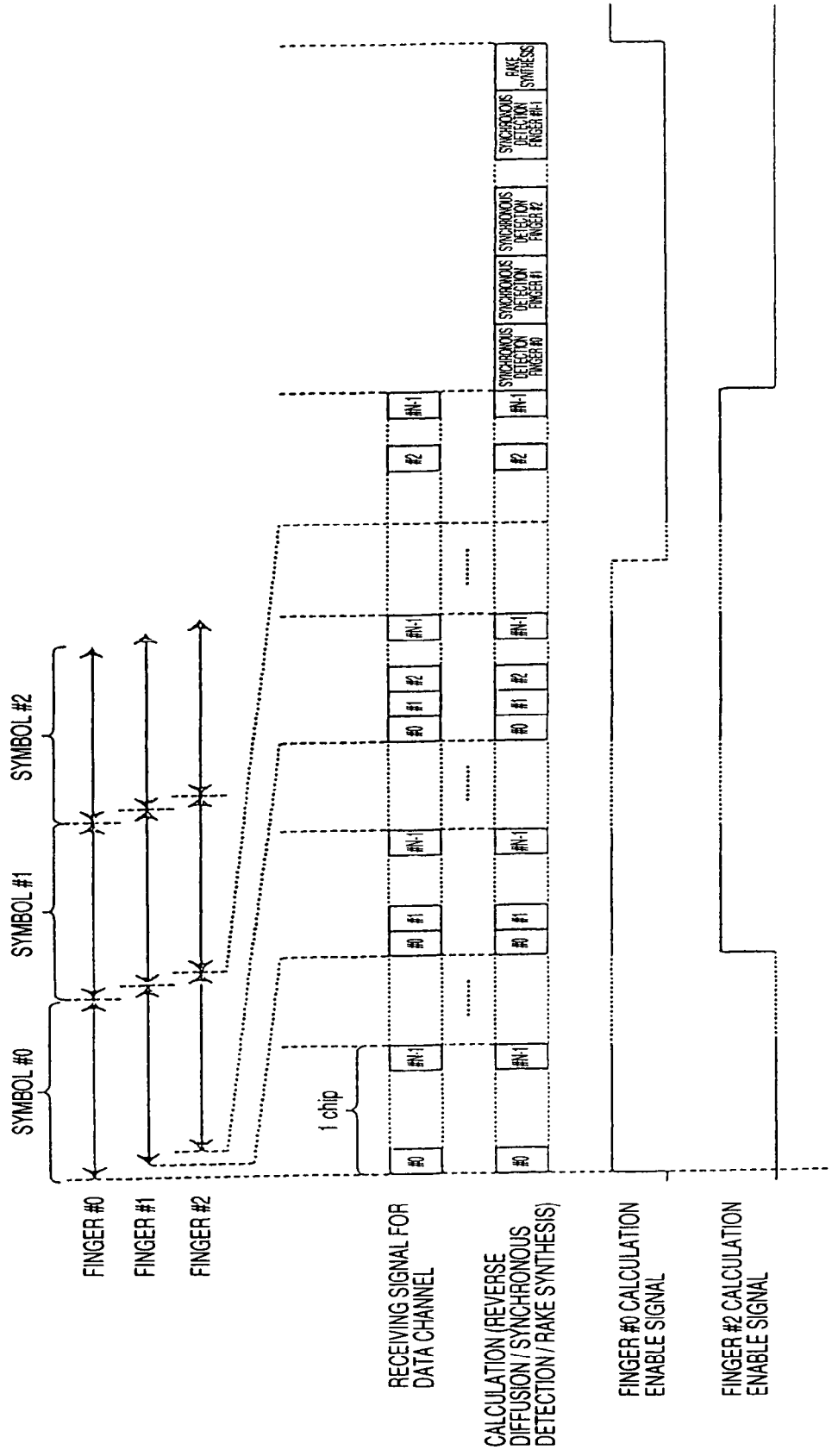
FIG. 19 is a timing chart showing an operation in the case in which receive data are stored in a state brought after a reverse diffusion according to the twelfth embodiment of the invention.

Next, an operation according to the embodiment will be described with reference to an operation timing chart of FIG. 19. A receiving signal 800 converted into discrete data is distributed every sample by the selector 801 and the discrete data are stored in any of the storage memories 802 (1) to (4). At the same time, receive data are input to the pilot reverse converting portions 806 and 809. When the timing generating portion 805 outputs pilot calculation enable signals 828 and 827 to the pilot reverse diffusing portions 806 and 809, the pilot symbol is reversely diffused by the pilot reverse converting portions 806 and 809 so that a phase estimation value and a weighted value are calculated in the phase estimating portions 807 and 810 by using the pilot symbol thus obtained.

On the other hand, when the receive data are stored corresponding to a desirable time in the storage memory 802, a storage end signal 804 is input from the selector 801 to the address generating portion 830. At this time, a phase estimation has been ended in the phase estimating portions 807 and 810. The address generating portion 830 sequentially issues an address to the storage memory 802 through the selector 803 and necessary data for each reverse diffusion processing are selected by the selector 803, and are then input as a data channel receiving signal 812 to the finger unit (from #0 to #N−1 and from #0 to #M−1) 824.

In the reverse diffusing portion of the finger unit 824, the receive data thus input are multiplied by a diffusion code corresponding to the receipt timing of each finger and the intermediate result of an integral is stored in the registers 820 and 821 for each finger and channel, and the reverse diffusion processing is carried out up to a specific symbol boundary while sequentially reading the receive data. For the symbol data of each finger, a phase estimation value and a weighted value are multiplied and the symbol value of each finger is added (rake synthesized) in the registers 822 and 823, and demodulated data 825 and 826 are output.

According to the receiving device in accordance with the twelfth embodiment, the reverse diffusion processing, the synchronous detection and the rake synthesizing processing of each finger are carried out in necessary timings for the calculations in accordance with the addresses issued by the address generating portion 830 present in an actual arithmetic unit. Therefore, access can be given to the storage memory 802 in an optional order and it is possible to increase a degree of freedom of the contents of the calculation in the finger unit 824.

Thirteenth Embodiment

Figure 20:
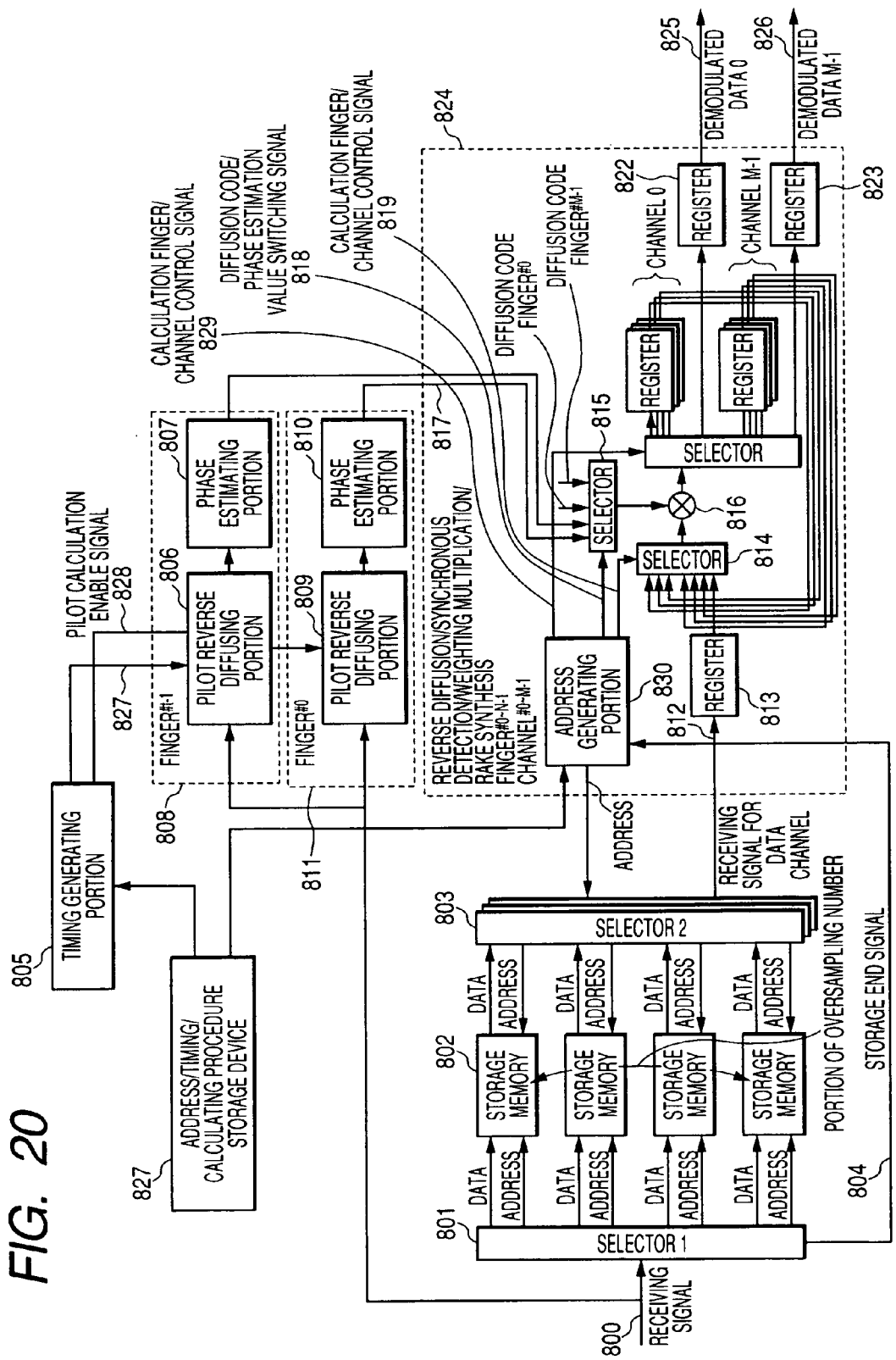
FIG. 20 is a block diagram showing the structure of a receiving device according to a thirteenth embodiment of the invention.

FIG. 20 is a block diagram showing the structure of a receiving device according to a thirteenth embodiment of the invention. Description will be given with the same portions as those in the twelfth embodiment shown in FIG. 19 having the same reference numerals, and the description will be properly omitted. The receiving device has a selector 801, a selector 803, a plurality of storage memories 802 (1) to (4), a finger unit 808 (#N−1), a finger unit 811 (#0), a finger unit 824 (#0) which is common to each of fingers and channels (from #0 to #N−1 and from #0 to #M−1), and a timing generating portion 805, and has the same structure as that in the twelfth embodiment. The thirteenth embodiment is different from the twelfth embodiment in that programs for determining a method of generating an address in an address generating portion 830 (a method of carrying out read from the storage memory 802) and various timing generating methods/calculating procedures of the timing generating portion 805 are supplied from an address and timing calculating procedure storage device 827 to be storage means.

According to the receiving device in accordance with the thirteenth embodiment, the programs for determining the address generating method (the method of carrying out read from the memory) and the timing generating methods/calculating procedure are stored in the calculating procedure storage device 827 to be the storage means, and the programs are changed over according to uses. Consequently, the address generating method of the address generating portion 830 and the timing generating method of the timing generating portion 805 can be changed over and a utilization for various applications can be carried out.

The structure according to the embodiment described above can be utilized for a synchronous processing with a base station which is used in W-CDMA, for example, and it is possible to carry out a high-speed synchronous processing by programmably switching a calculation control from a normal reverse diffusion processing in a reverse diffusion processing which is simplified by the execution of a processing of multiplying a plurality of diffusion codes for the same receive data and a recursive processing for a hierarchical orthogonal code, a Hadamard code or a Goley code. Moreover, hardware carrying out a synchronous processing can also use the storage memory 802 according to the embodiment to perform sharing during the synchronous processing.

Fourteenth Embodiment

Figure 21:
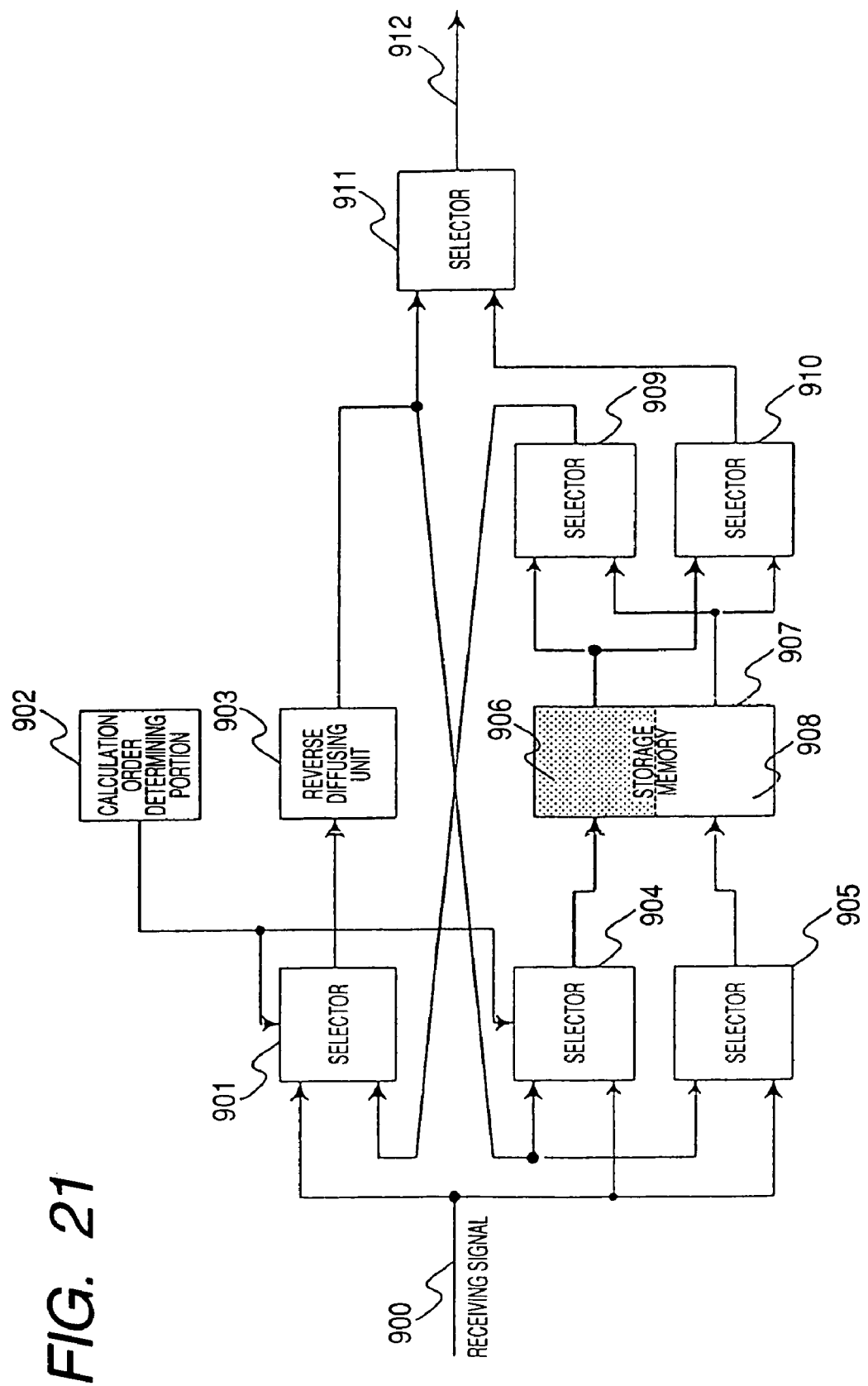
FIG. 21 is a block diagram showing the structure of the main part of a receiving device according to a fourteenth embodiment of the invention.

FIG. 21 is a block diagram showing the structure of the main part of a receiving device according to a fourteenth embodiment of the invention. In the receiving device, a reverse diffusion-delay processing storage system for receive data is constituted by selectors 901, 904, 905, 909, 910 and 911, a calculation order determining portion 902, a reverse diffusing portion 903 and a storage memory 907.

Next, description will be given to an operation according to the embodiment. The calculation order determining portion 902 is switched to an input (1) side in such a manner that the selectors 901, 904 and 905 select and output the input (1) respectively. A receiving signal 900 is reversely diffused in the reverse diffusing portion 903 through the selector 901 and is stored in a region 906 in the storage memory 907 through the selector 904. At the same time, the receiving signal 900 is directly stored in a region 908 in the storage memory 907 through the selector 905. More specifically, the receiving signal subjected to the reverse diffusion is stored in the region 906 in the storage memory 907 and the receiving signal which has not been diffused reversely is stored in the region 908.

Then, the calculation order determining portion 902 switches the selectors 901 and 909 to an input (2) side and switches the selector 911 to the input (1) side in a desirable timing, and thereafter, the receive data in the region 908 in the storage memory 907 are read and input to the reverse diffusing portion 903 through the selectors 909 and 901 so that receive data 912 thus diffused reversely are output through the selector 911.

Moreover, the selector 910 and the selector 911 are switched to the input (1) side, and the receive data subjected to the reverse diffusion in the region 906 in the storage memory 907 are then read and output through the selectors 910 and 911 so that the receive data subjected to the reverse diffusion which have been once stored can be output.

According to the receiving device in accordance with the fourteenth embodiment, the storage memory 907 is divided into the two regions 906 and 908 and the storage regions for the receive data can properly be used for times before and after the reverse diffusion. Consequently, it is possible to increase a degree of freedom of the combination of a calculation order.

Fifteenth Embodiment

Figure 22:
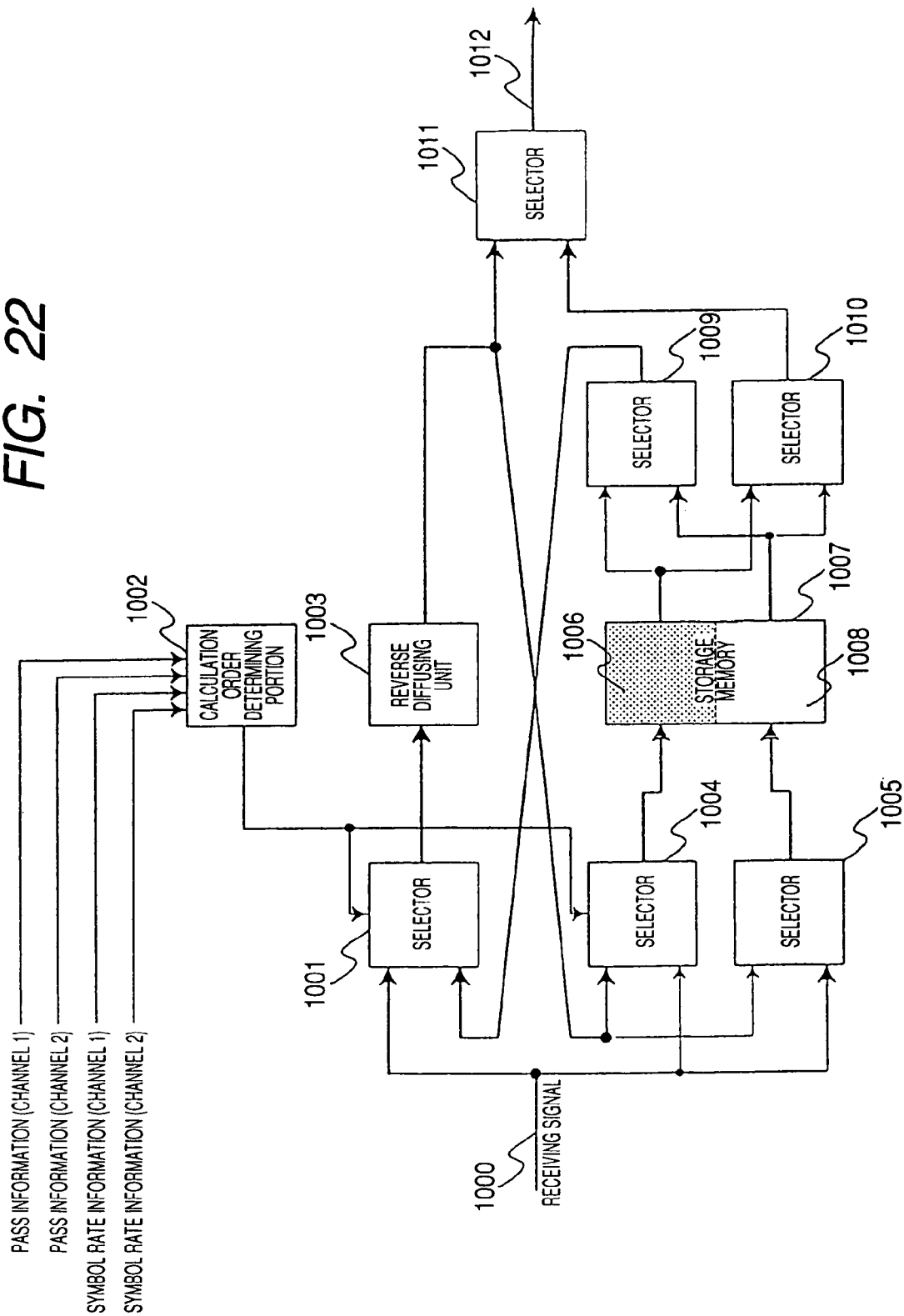
FIG. 22 is a block diagram showing the structure of the main part of a receiving device according to a fifteenth embodiment of the invention.

FIG. 22 is a block diagram showing the structure of the main part of a receiving device according to a fifteenth embodiment of the invention. The receiving device is constituted by selectors 1001, 1004, 1005, 1009, 1010 and 1011, a calculation order determining portion 1002, a reverse diffusing portion 1003, and a storage memory 1007, and is almost the same as that in the fourteenth embodiment shown in FIG. 21 and is different therefrom in that inputs for pass information and symbol rate information about channels 1 and 2 are provided as the determining factor of the calculation order determining portion 1002.

Next, description will be given to an operation according to the embodiment. While the control of the calculation order for the calculation order determining portion 1002 is determined by the symbol rate information and the pass information for each channel, a symbol rate and the number of fingers to be assigned are varied depending on the channel in some cases. More specifically, a combination of DPCH and DSCH in a W-CDMA method can be taken as an example.

In the case in which there are provided a channel (DPCH) carrying out diversity handover and a channel (DSCH) communicating with only a specific base station, the calculation order determining portion 1002 stores symbols after the reverse diffusion in relation to either of the channels which has a small number of fingers and a low symbol rate. More specifically, the calculation order determining portion 1002 switches the selectors 1001 and 1004 to select and output an input (1) respectively. A receiving signal 1000 is reversely diffused by the reverse diffusing portion 1003 through the selector 1001 and is stored in a region 1006 in the storage memory 1007 through the selector 1004.

On the other hand, in case of the channel having a large number of fingers and a high symbol rate, the calculation order determining portion 1002 stores the receive data which have not been diffused reversely. More specifically, the calculation order determining portion 1002 switches the selector 1005 to an input (2) side and the receiving signal 1000 is stored in a region 1008 in the storage memory 1007 through the selector 1005.

According to the receiving device in accordance with the fifteenth embodiment, it is possible to use the optimum storage memory 1007 by switching a storage order depending on the number of the fingers and the symbol rate.

Sixteenth Embodiment

Figure 23:
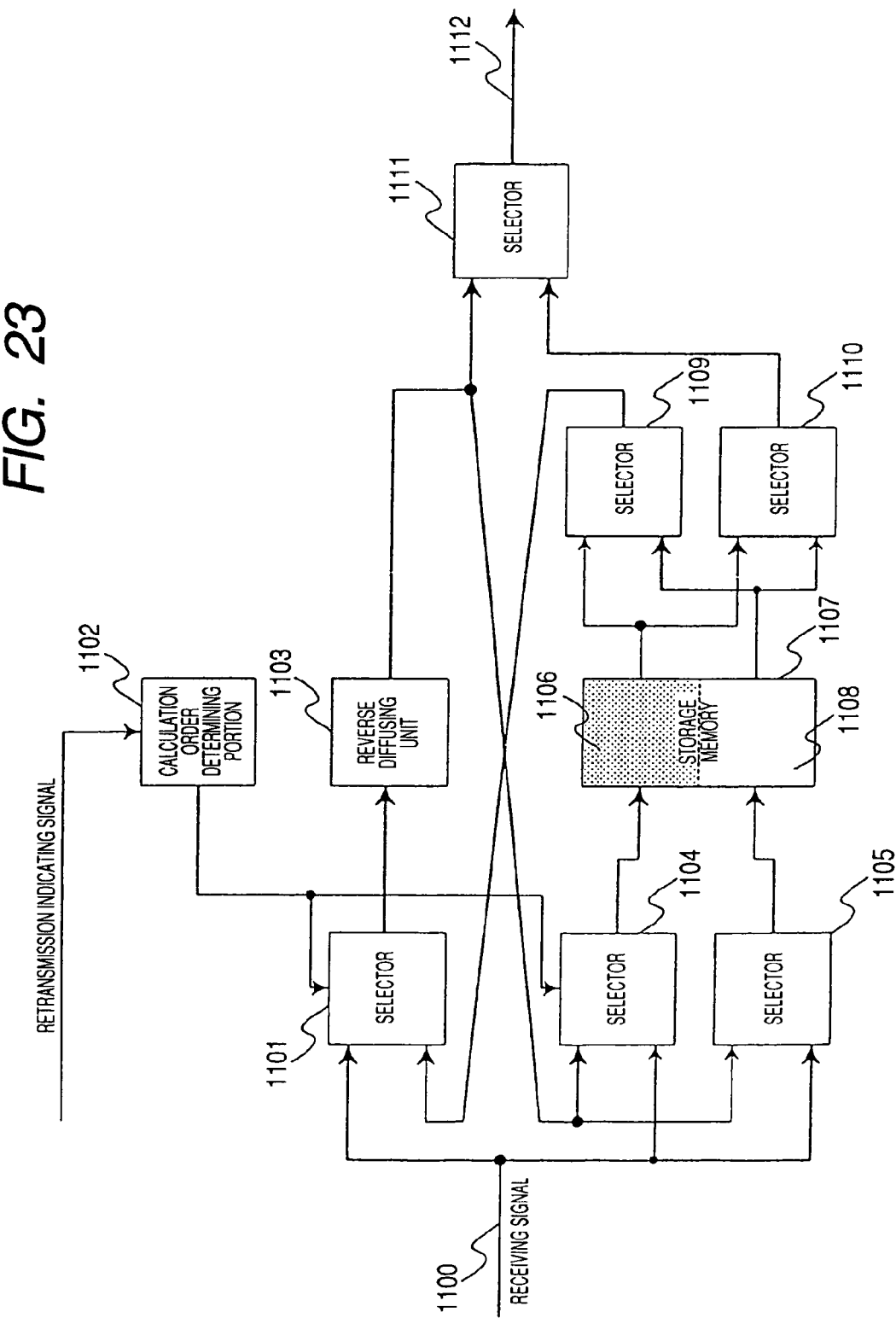
FIG. 23 is a block diagram showing the structure of a receiving device according to a sixteenth embodiment of the invention.

FIG. 23 is a block diagram showing the structure of a receiving device according to a sixteenth embodiment of the invention. The receiving device is constituted by selectors 1101, 1104, 1105, 1109, 1110 and 1111, a calculation order determining portion 1102, a reverse diffusing portion 1103, and a storage memory 1107, and is almost the same as that in the fourteenth embodiment shown in FIG. 21 and is different therefrom in that an input for a retransmission indicating signal is provided as the determining factor of the calculation order determining portion 1102, and the embodiment features an application to a hybrid ARQ method as compared with the fourteenth embodiment.

Figure 24:
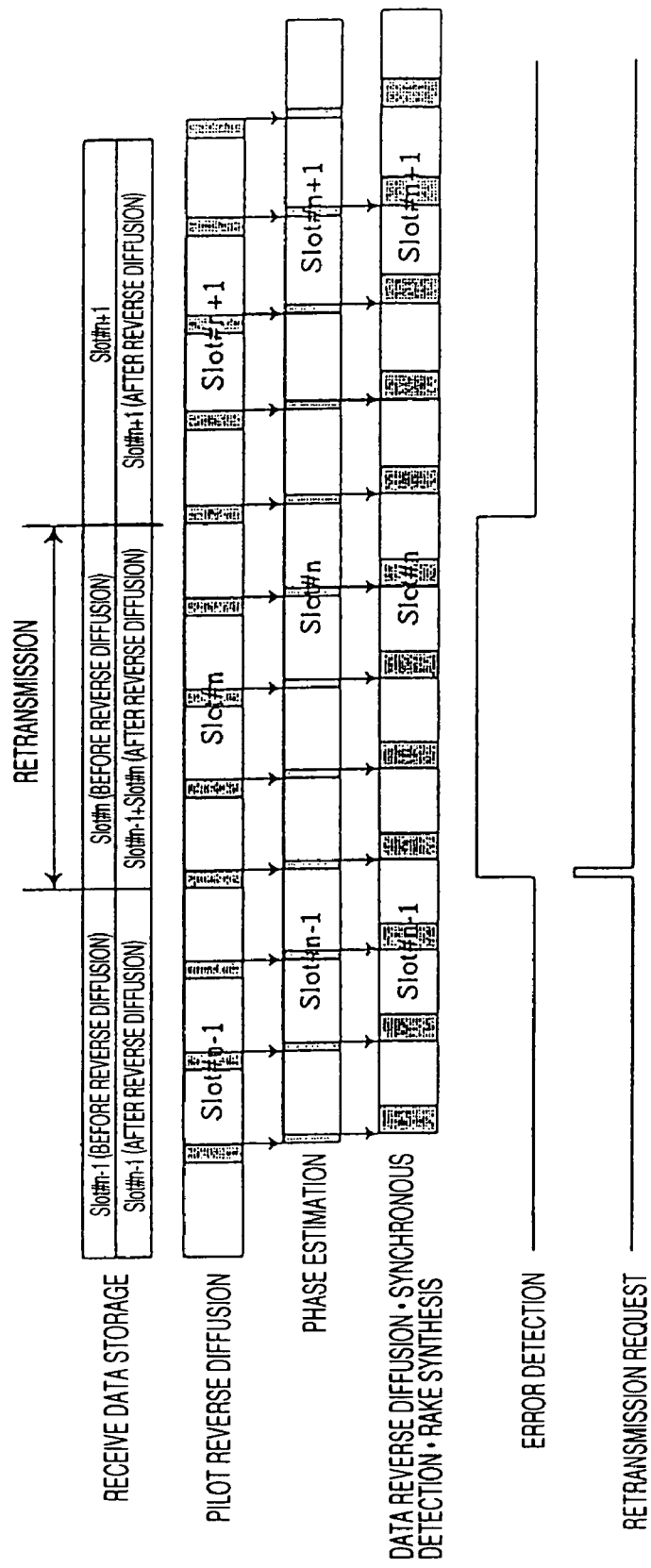
FIG. 24 is a timing chart showing an operation in the case in which receive data are stored in a state brought after a reverse diffusion according to the sixteenth embodiment of the invention.

Next, an operation according to the embodiment will be described with reference to an operation timing chart of FIG. 24. When the calculation order determining portion 1102 switches the selector 1105 to an input (2) side, a receiving signal 1100 is stored in a region 1108 in the storage memory 1107 through the selector 1105. Then, the calculation order determining portion 1102 switches the selectors 1101 and 1109 to the input (2) side in a desirable timing and the receive data are read from the region 1108 in the storage memory 1107 through the selector 1109, and are input to the reverse diffusing portion 1103 through the selector 1101 and are thus diffused reversely, and data 1112 diffused reversely through the selector 1111 switched to an input (1) side are output. At this time, the calculation order determining portion 1102 switches the selector 1104 to the input (1) side so that the data subjected to the reverse diffusion are output as the data 1112, and furthermore, are stored in a region 1106 of the storage memory 1107 through the selector 1104.

In the case in which an error is decided by an output symbol, the retransmission indicating signal is input to the calculation order determining portion 1102. Therefore, the calculation order determining portion 1102 switches the selectors 1109 and 1111 to the input (2) side to read a symbol stored and held in the region 1106 of the storage memory 1107 and to add the symbol to a retransmission symbol when a retransmission is carried out.

According to the receiving device in accordance with the sixteenth embodiment, it is possible to easily hold symbol data in the retransmission of hybrid ARQ by using the storage memory 1107.

According to the first to sixteenth embodiments, a consideration has been made by bearing, in mind, to mount the structure according to the invention on a semiconductor integrated circuit. The embodiments are carried out in order to reduce the scale of a semiconductor circuit and to enhance the flexibility of a hardware processing, and the structure of the circuit according to each of the embodiments is realized as a semiconductor integrated circuit.

Seventeenth Embodiment

Figure 25:
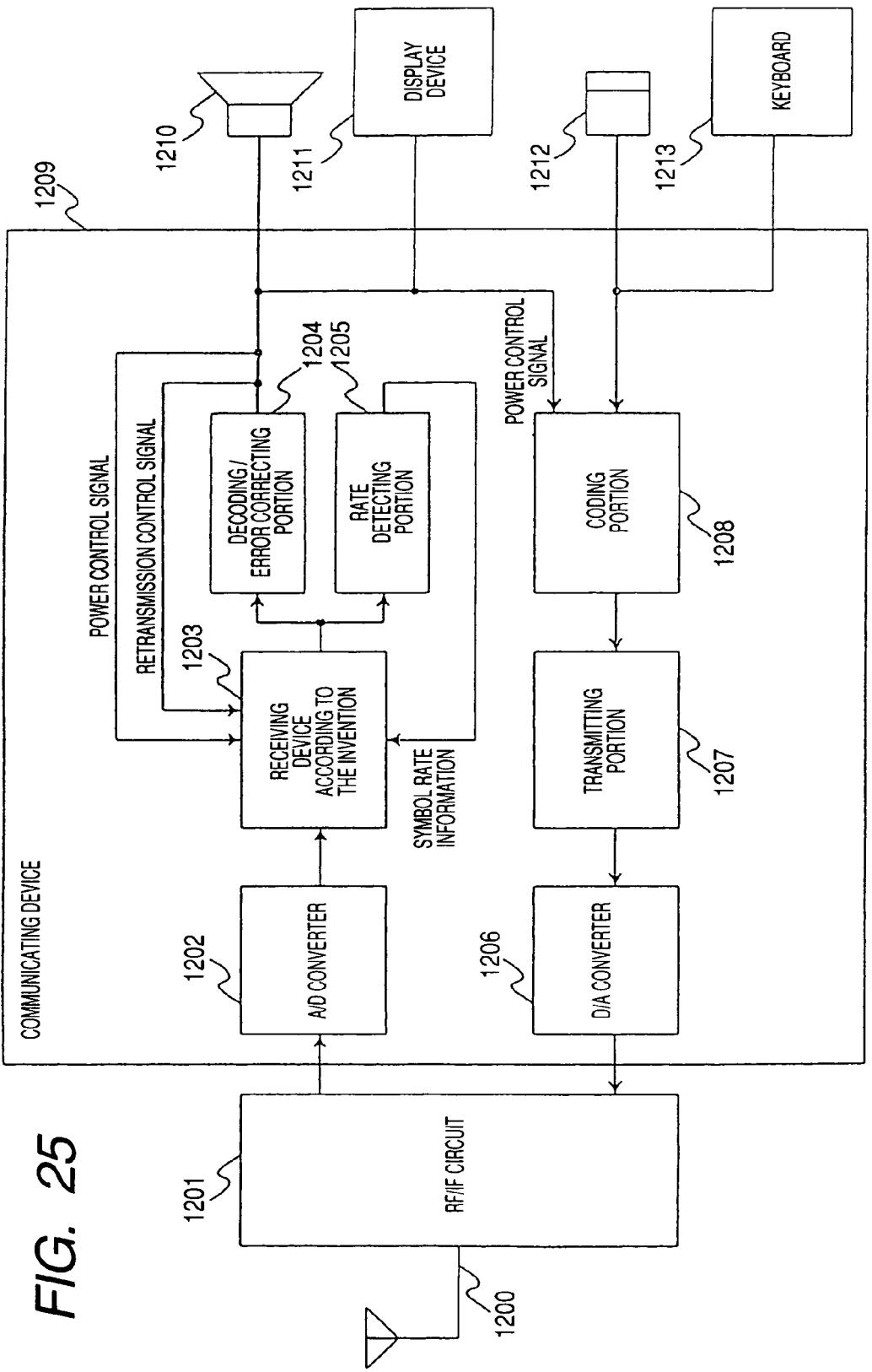
FIG. 25 is a block diagram showing the structure of a communicating device according to a seventeenth embodiment of the invention.

FIG. 25 is a block diagram showing the structure of a communicating device according to a seventeenth embodiment of the invention. The communicating device has an antenna 1200, an RF (radio frequency)/IF (intermediate frequency) circuit 1201, an AD converting portion 1202, a receiving device 1203, a decoding/error correcting portion 1204, a rate detecting portion 1205, a DA converting portion 1206, a transmitting portion 1207, a coding portion 1208, a speaker 1210, a display device 1211, a microphone 1212, and a keyboard 1213. Herein, it is assumed that the receiving device 1203 has the structure according to any of the first to sixteenth embodiments.

Next, description will be given to an operation according to the embodiment. An RF signal supplied from the antenna 1200 is received by the RF/IF circuit 1201 and is changed into an intermediate frequency signal, and is converted into a discrete signal in the AD converting portion 1202 and is input to the receiving device 1203. The receiving device 1203 carries out various processings described in the first to sixteenth embodiments to generate decode data, and the decode data are input to the decoding/error correcting portion 1204 and the rate detecting circuit 1205. In the decoding/error correcting portion 1204, the error correction of the received decode data is carried out, and furthermore, an audio signal, an image signal, a power control signal and a retransmission control signal are separated. The audio signal is output from the speaker 1210, the image signal is displayed by the display device 1211, and the power control signal and the retransmission control signal are fed back to the receiving device 1203. Moreover, a symbol rate is detected from the decode data in the rate detecting circuit 1205 and is fed back to the receiving device 1203. The power control signal, the retransmission control signal and the symbol rate act as the control factors of the receiving device 1203.

As described in the first to sixteenth embodiments, the receiving device 1203 changes the procedure for storing a receiving signal before or after a reverse diffusion by using the power control signal, the retransmission control signal and the symbol rate and determining a calculation order together therewith.

On the other hand, a voice collected by the microphone 1212 and information input from the keyboard 1213 are coded by the coding portion 1208, and furthermore, are modulated by the transmitting portion 1207, and are then converted into an analog signal by the DA converting portion 1206 and the analog signal is thereafter caused to have a radio frequency in the RF/IF circuit 1201, and is thus transmitted through the antenna 1200.

According to the communicating device in accordance with the seventeenth embodiment, the scale of the circuit of the receiving device 1203 is reduced. Consequently, the size of the communicating device can be reduced.

Eighteenth Embodiment

Figure 26:
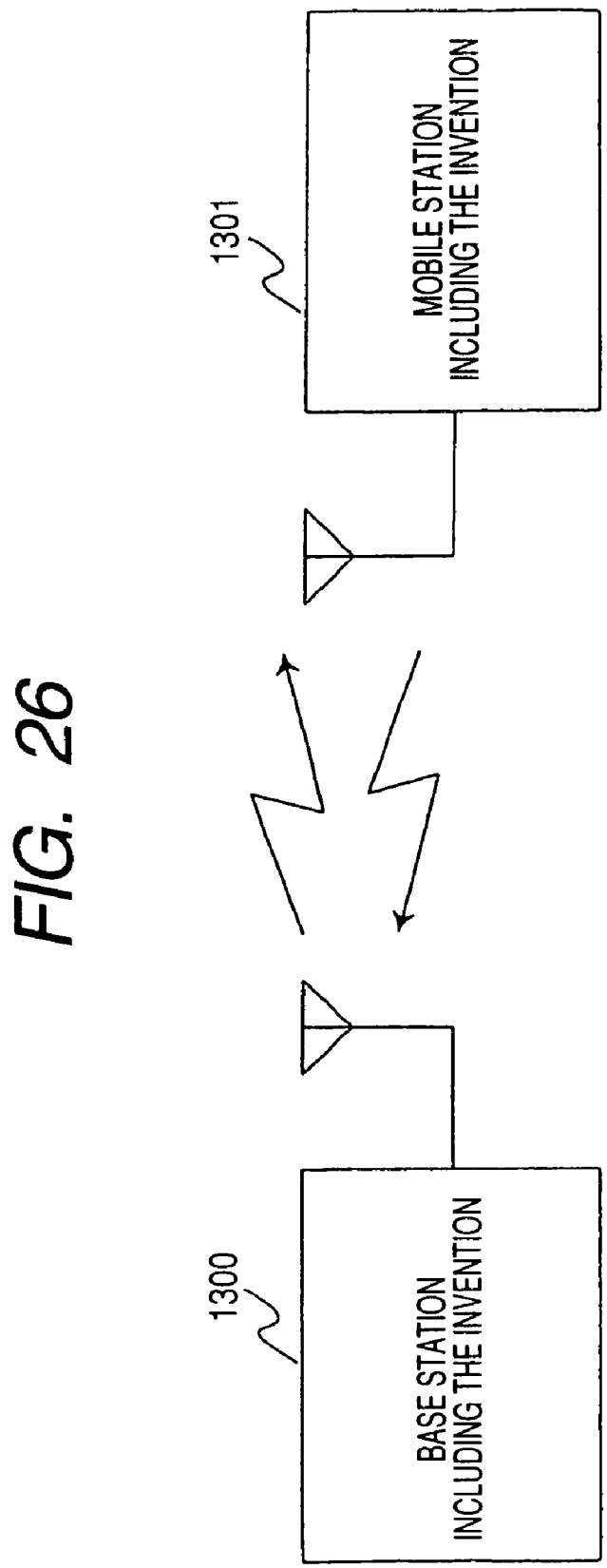
FIG. 26 is a block diagram showing the structure of a communicating system according to an eighteenth embodiment of the invention.
Figure 28:
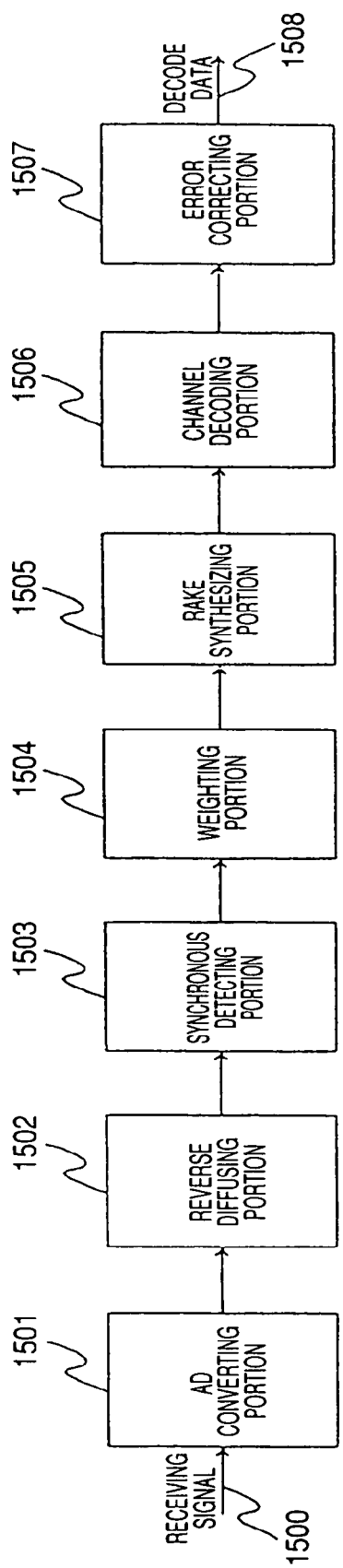
FIG. 28 is a block diagram showing an example of the structures of a reverse diffusing and synchronous detecting circuits in a conventional receiving device.
Figure 29:
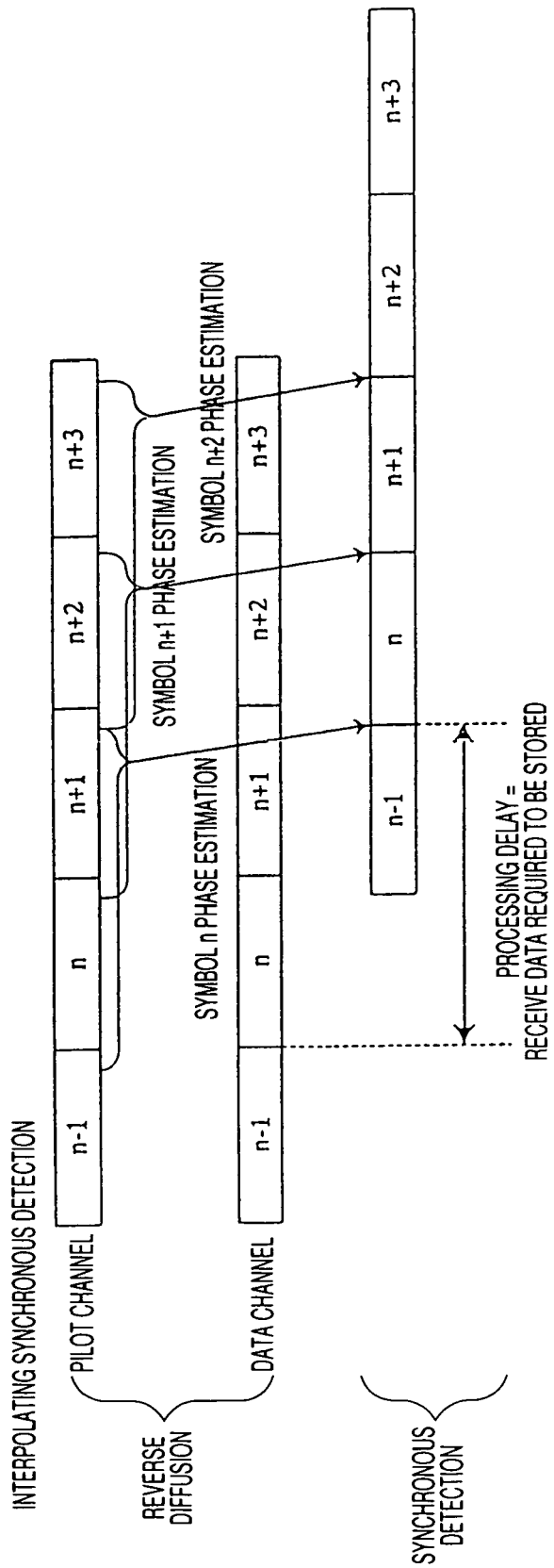
FIG. 29 is an operation timing chart for explaining a conventional interpolating synchronous detecting operation.
Figure 30:
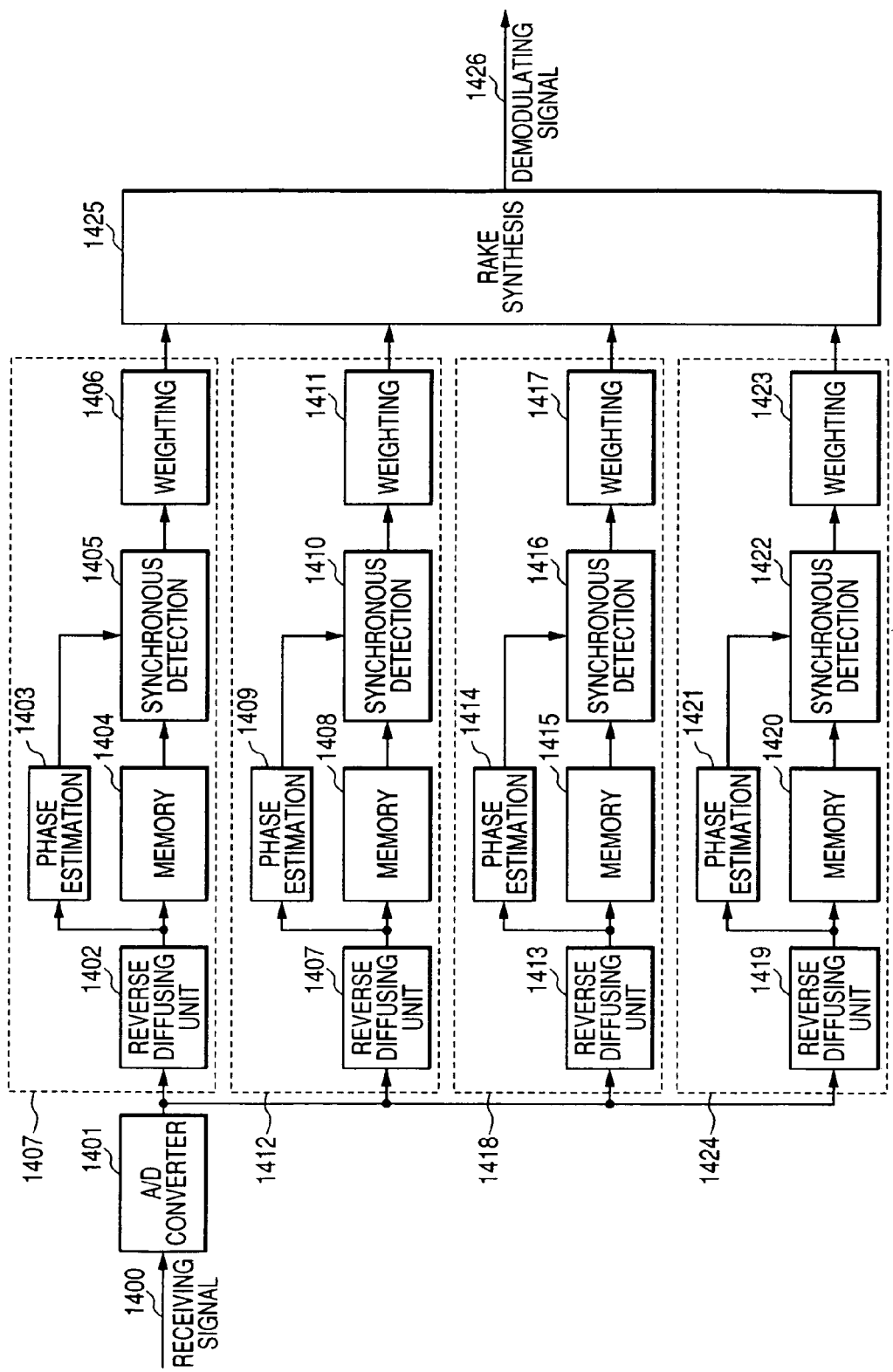
FIG. 30 is a block diagram showing the structure of a conventional receiving device.
Figure 31:
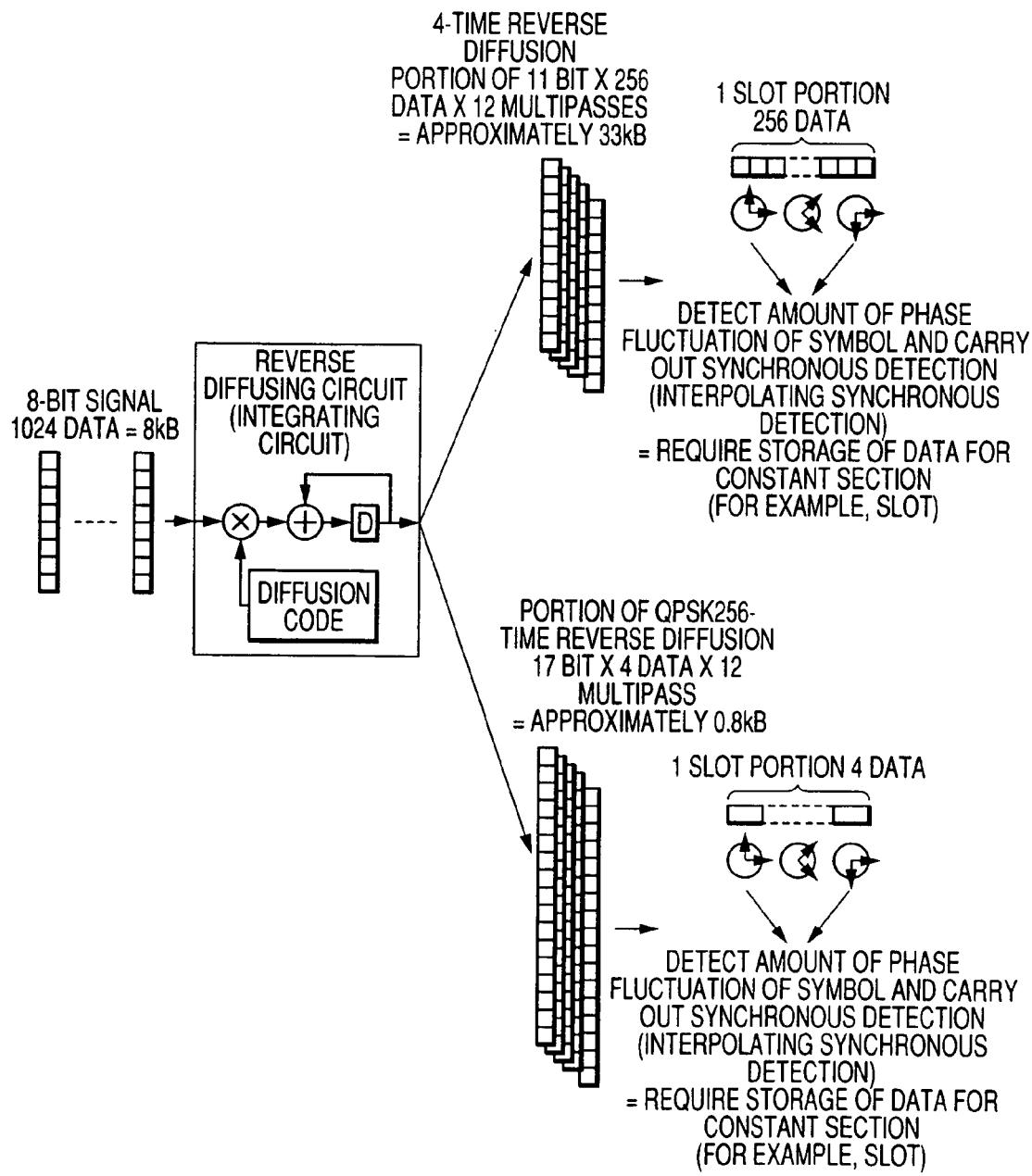
FIG. 31 is a diagram showing a difference in a data storage capacity obtained after a reverse diffusion depending on a difference in a diffusion rate.

FIG. 26 is a block diagram showing the structure of a communicating system according to an eighteenth embodiment of the invention. While a radio communication is carried out between a base station 1300 and a mobile station 1301, the communicating device shown in FIG. 25 is mounted on the base station 1300 and the mobile station 1301 and they make a pair to be used.

A symbol rate, a communication channel and handover information are given from the base station 1300 to the communicating device of the mobile station 1301. Therefore, the mobile station 1301 can switch a method of storing a receiving signal in a memory based on the information thus given. Moreover, the symbol rate, the communication channel and the handover information are given from the mobile station 1301 to the communicating device of the base station 1300. Therefore, the base station 1300 can switch a method of storing a receiving signal in a memory based on the information thus given.

The communicating system in accordance with the eighteenth embodiment is used in the base station 1300 and the mobile station 1301 by making a pair with the communicating device according to the seventeenth embodiment. Consequently, the receiving device according to each of the first to sixteenth embodiments which is mounted on the communicating device can be utilized in an actual communicating system.

While the invention has been described in detail with reference to the specific embodiments, it is apparent to the skilled in the art that various changes and modifications can be made without departing from the spirit and scope of the invention.

The application is based on Japanese Patent Application No. 2003-165308 filed on Jun. 10, 2003 and contents thereof are incorporated herein by reference.

INDUSTRIAL APPLICABILITY

According to the invention, it is possible to enhance the use efficiency of a storage memory by switching the storage of receive data which are an object to be detected synchronously before or after a reverse diffusion depending on various factors. Consequently, it is possible to reduce the storage memories and to increase a degree of freedom of a processing timing in the reverse diffusion processing.

The invention claimed is:

1. A receiving device for carrying out an interpolating synchronous detection when receiving a code division multiple signal, comprising:
   storage means for storing receive data which are an object to be detected synchronously; and
   control means for switching a storage of the receive data which are the object to be detected synchronously in the storage means before or after de-spreading,
   wherein the control means changes a storage order for the receive data based on symbol rate information obtained when demodulating the receive data.

2. The receiving device according to claim 1, wherein the control means changes a storage order for the receive data based on multipass information obtained when demodulating the receive data.

3. The receiving device according to claim 1, wherein the control means changes a storage order for the receive data in response to an instruction sent from a power control system of the receiving device.

4. The receiving device according to claim 1, further comprising means for carrying out a receipt processing corresponding to a plurality of multipasses, thereby rake synthesizing a plurality of receiving signals demodulated on a pass correspondence.

5. The receiving device according to claim 1, further comprising means for independently receiving a pilot symbol to carry out a phase estimation for a synchronous detection and receiving a data symbol, the control means carrying out a switching control for a storage of the received data symbol which are the object to be detected synchronously in the storage means before or after the reverse diffusion when independently receiving the pilot symbol and the data symbol respectively.

6. The receiving device according to claim 1, wherein a reverse diffusion processing and a synchronous detection processing for receiving signals of a plurality of channels are carried out by using an identical circuit.

7. The receiving device according to claim 1, wherein a reverse diffusion processing and a synchronous detection processing for receiving signals of a plurality of passes are carried out by using an identical circuit.

8. The receiving device according to claim 1, wherein a reverse diffusion processing, a synchronous detection processing and a rake synthesis processing for a plurality of passes and a plurality of channels are carried out at the same time by using an identical circuit.

9. The receiving device according to claim 1, wherein the storage means has storage memories corresponding to an oversampling degree or a plurality of storage memories.

10. The receiving device according to claim 1, wherein receive data read continuously from the storage means are consecutively diffused reversely.

11. The receiving device according to claim 1, wherein receive data read from the storage means in an optional order are diffused reversely.

12. The receiving device according to claim 1, wherein the control means changes contents of a calculation in accordance with a program.

13. The receiving device according to claim 1, wherein the storage means divides the data obtained before and after the reverse diffusion and stores them therein, respectively.

14. The receiving device according to claim 13, wherein the control means changes a storage order for the receive data depending on a symbol rate and the number of fingers in each of a plurality of receiving channels.

15. The receiving device according to claim 13, wherein when an error is found in a demodulating signal of a receiving signal, data stored in the storage means are synthesized with data retransmitted in accordance with a hybrid ARQ method.

16. A semiconductor integrated circuit comprising the receiving device according to claim 1.

17. A communicating device comprising the receiving device according to claim 1 or the semiconductor integrated circuit according to claim 16, wherein a code division multiplex communication is carried out.

* * * * *

UNITED STATES PATENT AND TRADEMARK OFFICE
CERTIFICATE OF CORRECTION

PATENT NO.       : 7,643,462 B2                                        Page 1 of 1
APPLICATION NO.  : 10/559685
DATED            : January 5, 2010
INVENTOR(S)      : Kimiaki Ando It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1011 days.

Signed and Sealed this

Twenty-first Day of December, 2010

David J. Kappos
*Director of the United States Patent and Trademark Office*